(12) United States Patent
Takami et al.

(10) Patent No.: US 11,322,742 B2
(45) Date of Patent: May 3, 2022

(54) ACTIVE MATERIAL, ELECTRODE, SECONDARY BATTERY, BATTERY PACK AND VEHICLE

(71) Applicant: KABUSHIKI KAISHA TOSHIBA, Minato-ku (JP)

(72) Inventors: Norio Takami, Yokohama (JP); Keigo Hoshina, Yokohama (JP); Mitsuru Ishibashi, Yokohama (JP); Yoshihiko Nakano, Yokohama (JP); Yasuhiro Harada, Isehara (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 16/561,885

(22) Filed: Sep. 5, 2019

(65) Prior Publication Data

US 2020/0295361 A1  Sep. 17, 2020

(30) Foreign Application Priority Data

Mar. 13, 2019  (JP) .............................. JP2019-045419

(51) Int. Cl.
*H01M 4/485* (2010.01)
*H01M 4/62* (2006.01)
(Continued)

(52) U.S. Cl.
CPC ............. *H01M 4/485* (2013.01); *B60L 50/64* (2019.02); *C01G 35/006* (2013.01);
(Continued)

(58) Field of Classification Search
CPC ...... H01M 4/131; H01M 4/366; H01M 4/485; H01M 4/625; H01M 4/626;
(Continued)

(56) References Cited

U.S. PATENT DOCUMENTS 8,962,188 B2 * 2/2015 Zhamu ................. H01M 4/134
429/223
2012/0052401 A1  3/2012 Goodenough et al.
(Continued)

FOREIGN PATENT DOCUMENTS

JP  2010-287496 A  12/2010
JP  2014-153131 A  8/2014
JP  2016-139525 A  8/2016

*Primary Examiner* — Ula C Ruddock
*Assistant Examiner* — Mary Grace Byram
(74) *Attorney, Agent, or Firm* — Oblon, McClelland, Maier & Neustadt, L.L.P.

(57) ABSTRACT

According to one embodiment, provided is an active material including monoclinic niobium titanium composite oxide particles, and carbon fibers with which at least a part of surfaces of the monoclinic niobium titanium composite oxide particles is covered. The monoclinic niobium titanium composite oxide particles satisfy $1.5 \leq (\alpha/\beta) \leq 2.5$. The monoclinic niobium titanium composite oxide particles have an average primary particle size of 0.05 μm to 2 μm. The carbon fibers contain one or more metal elements selected from the group consisting of Fe, Co and Ni, and satisfy $1/10000 \leq (\gamma/\sigma) \leq 1/100$. The carbon fibers have an average fiber diameter in the range of 5 nm to 100 nm.

13 Claims, 8 Drawing Sheets

(51) Int. Cl.
*H01M 10/42* (2006.01)
*H01M 4/36* (2006.01)
*H01M 10/0525* (2010.01)
*B60L 50/64* (2019.01)
*C01G 35/00* (2006.01)
*B60L 7/10* (2006.01)

(52) U.S. Cl.
CPC ........... *H01M 4/366* (2013.01); *H01M 4/625* (2013.01); *H01M 10/0525* (2013.01); *H01M 10/425* (2013.01); *B60L 7/10* (2013.01); *B60Y 2200/91* (2013.01); *B60Y 2400/112* (2013.01); *C01P 2004/61* (2013.01); *C01P 2004/62* (2013.01); *C01P 2004/64* (2013.01); *C01P 2006/40* (2013.01); *H01M 2010/4271* (2013.01); *H01M 2220/20* (2013.01)

(58) Field of Classification Search
CPC ........... H01M 10/0525; H01M 10/425; H01M 2004/021; H01M 2004/027; H01M 2010/4271; H01M 2220/20; B60L 50/64; B60Y 2200/91; C01G 35/006
See application file for complete search history.

(56) References Cited

U.S. PATENT DOCUMENTS

| | | | |
|---|---|---|---|
| 2015/0010820 A1* | 1/2015 | Takami | H01M 10/05 429/221 |
| 2016/0276663 A1* | 9/2016 | Yoshida | H01M 4/364 |
| 2017/0069910 A1* | 3/2017 | Harada | C01G 41/006 |
| 2017/0077510 A1* | 3/2017 | Zhang | H01M 4/525 |
| 2018/0277835 A1* | 9/2018 | Ise | H01M 10/052 |
| 2018/0277841 A1* | 9/2018 | Harada | C01G 49/0027 |

* cited by examiner

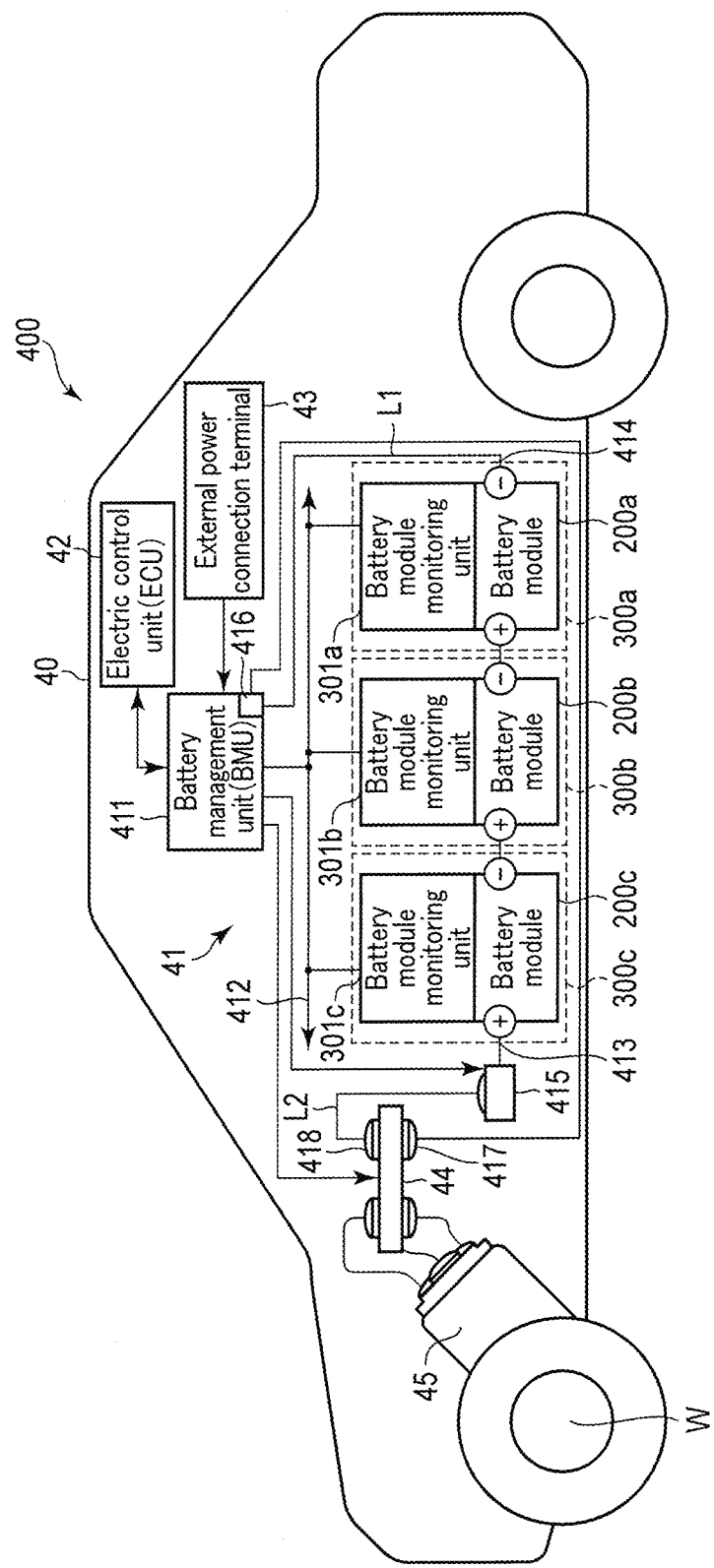
F I G. 9

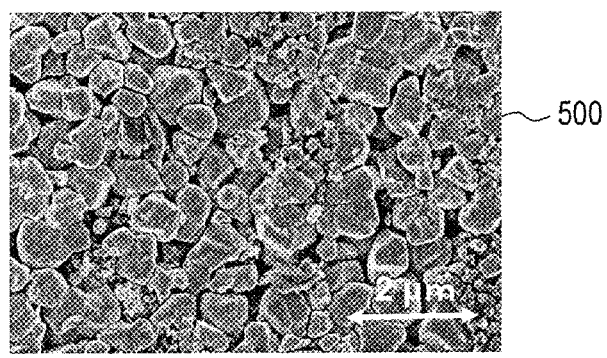
F I G. 10
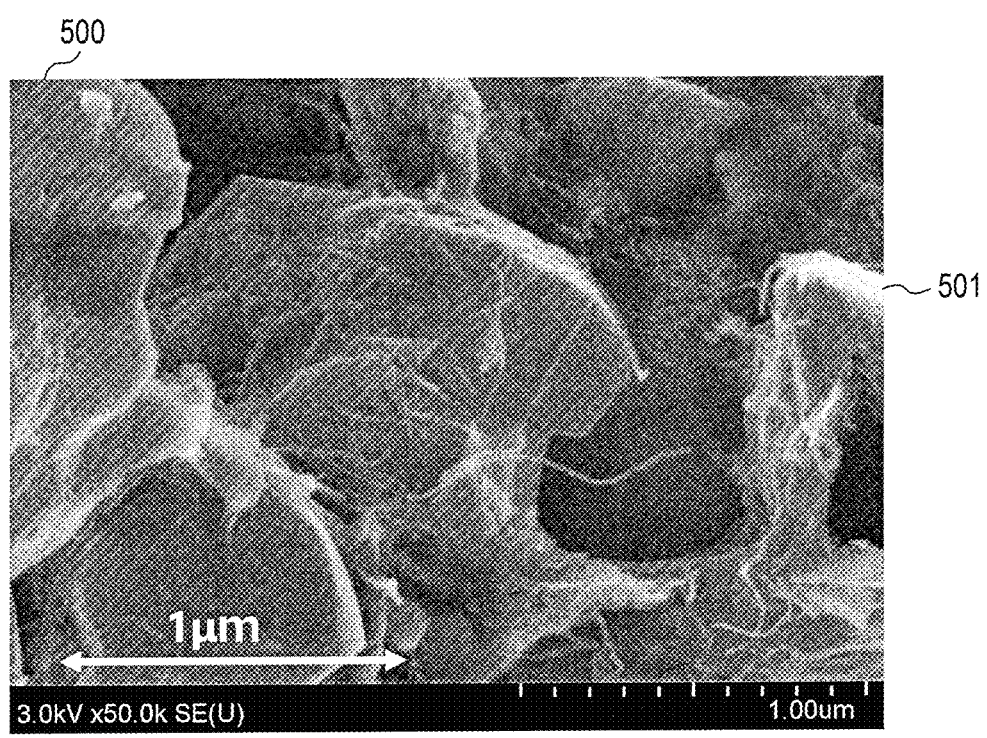
F I G. 11

ACTIVE MATERIAL, ELECTRODE, SECONDARY BATTERY, BATTERY PACK AND VEHICLE

CROSS-REFERENCE TO RELATED APPLICATIONS

This application is based upon and claims the benefit of priority from the Japanese Patent Application No. 2019-045419, filed Mar. 13, 2019, the entire contents of which are incorporated herein by reference.

FIELD

Embodiments described herein relate to an active material, an electrode, a secondary battery, a battery pack, and a vehicle.

BACKGROUND

A nonaqueous electrolyte battery using a graphite material or a carbonaceous material that allows lithium ions to be inserted in and extracted from, in a negative electrode, has been commercially available as a high-energy density battery for portable equipment. In recent years, a Ni-containing lithium metal oxide such as $LiNi_aCo_bAl_{1-a-b}O_2$ or $LiNi_{a}Co_bMn_{1-a-b}O_2$ has been progressively put to practical use as a positive electrode active material alternative to $LiCoO_2$ and $LiMn_2O_4$ in order to further enhance the energy density of the battery.

Meanwhile, in the case of installation in a vehicle such as an automobile or a train, a material excellent in chemical and electrochemical stability, strength, and corrosion resistance is demanded as each constituent material of a positive electrode and a negative electrode in terms of storage performance under a high-temperature environment, cycle performance, and high-output and long-term reliability. Furthermore, such each constituent material of a positive electrode and a negative electrode is demanded to have high performance in cold climates, high-output performance under a low-temperature environment (−40° C.), and long-life performance. While a non-volatile and non-flammable electrolytic solution has been progressively developed from the viewpoint of an enhancement in safety performance of a nonaqueous electrolyte, there has not been put to practical use yet because decreases in output characteristics, low-temperature performance and long-life performance are caused.

As described above, there are challenges about high-temperature durability, cycle life, safety and output performance in order to install a lithium ion battery in a vehicle or the like.

Use of a negative electrode of titanium oxide such as $TiO_2$ or $Li_4Ti_5O_{12}$ instead of a negative electrode of a graphite material or a carbonaceous material causes a battery to decrease in energy density, although allowing a battery to be improved in life performance and safety. Such a decrease in the energy density of a battery is caused by a decrease in battery voltage due to a high negative electrode potential of titanium oxide (vs. Li), of about 1.5 V, and by a low negative electrode capacity. Therefore, there is a need for a titanium-based oxide high in capacity and excellent in output performance and life performance in order to impart an increased battery capacity.

BRIEF DESCRIPTION OF THE DRAWINGS

FIG. 9 is a view schematically showing other example of a vehicle according to an embodiment;

FIG. 10 is a view showing a scanning electron micrograph of an active material of Example 1; and FIG. 11 is a view showing a scanning electron micrograph of the active material of Example 1.

DETAILED DESCRIPTION

First Embodiment

Figure 1:
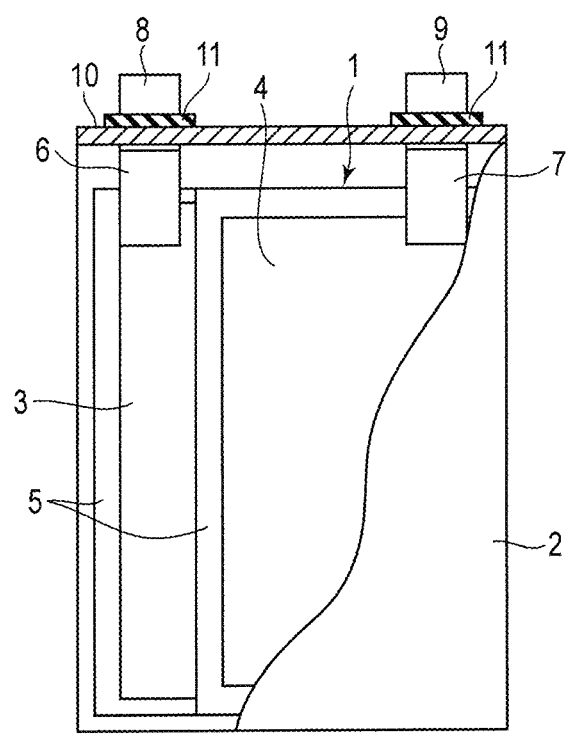
FIG. 1 is a partially cut cross-sectional view of a secondary battery of an embodiment.

According to one embodiment, provided is an active material including monoclinic niobium titanium composite oxide particles which are able to allow Li ions to be inserted and to be extracted, and carbon fibers with which at least a part of surfaces of the monoclinic niobium titanium composite oxide particles is covered. The monoclinic niobium titanium composite oxide particles satisfy the following expression (1). The monoclinic niobium titanium composite oxide particles have an average primary particle size of 0.05 µm or more and 2 µm or less. The carbon fibers contain one or more metal elements selected from the group consisting of Fe, Co and Ni, and satisfy the following expression (2), and the carbon fibers have an average fiber diameter in the range of 5 nm or more and 100 nm or less, $$1.5 \leq (\alpha/\beta) \leq 2.5 \quad (1)$$

$$1/10000 \leq (\gamma/\sigma) \leq 1/100 \quad (2)$$

wherein α represents a number of mole of Nb in the niobium titanium composite oxide particles, β represents a number of mole of Ti in the niobium titanium composite oxide particles, γ represents a weight of all the metal elements in the carbon fibers, and σ represents a weight of carbon in the carbon fibers.

According to another embodiment, provided is an electrode including the active material according to the embodiment.

According to a further other embodiment, provided is a secondary battery including a positive electrode, a negative electrode including the active material according to the embodiment, and a nonaqueous electrolyte.

According to still another embodiment, provided is a battery pack including the secondary battery according to the embodiment.

According to yet another embodiment, provided is a vehicle including the battery pack according to the embodiment.

The carbon fibers described above are easily dispersed in surfaces of the niobium titanium composite oxide particles, and thus are uniformly dispersed in the surfaces of the niobium titanium composite oxide particles, thereby allowing the surfaces to be covered with the carbon fibers, resulting in a decrease in electrode resistance. In addition, the niobium titanium composite oxide described above, when increased in the amount of lithium inserted for an increase in charge capacity, is increased in the change in volume. The active material of the embodiment can maintain the effect of an electronically conductive network due to the carbon fibers covering, even when repeatedly expanded and contracted in volume along with insertion and extraction of lithium ions. As a result of the above, a battery is greatly improved in rate performance and cycle life performance.

Herein, the metal element in the carbon fibers, although eluted in an electrolyte when exposed to a high potential, is not precipitated in an electrode and a separator at a potential (around 1.5 V (vs. Li/Li$^+$)) in inserted in and extracted from of lithium ions by the niobium titanium composite oxide, and thus is free from risk of inducing internal short-circuit.

The niobium titanium composite oxide particles desirably include a monoclinic niobium titanium composite oxide represented by $Li_xTiM_wNb_{2\pm y}O_{7\pm z}$ ($0 \le x \le 5$, $0 \le y \le 0.5$, $-0.3 \le z \le 0.3$ and $0 \le w \le 0.01$ are satisfied, and M represents at least one metal other than Ti and Nb). Such a niobium titanium composite oxide particles are mixed with the carbon fibers, thereby allowing uniform dispersion and covering surface to be facilitated, and allowing an electronically conductive network in an electrode to be uniform, resulting in great enhancements in rate performance and cycle life performance.

M desirably includes at least one metal element selected from the group consisting of K and Ta. Metal elements such as K and Ta each serve as a flux, and thus can allow the niobium titanium composite oxide to be synthesized by a low-temperature heat treatment. As a result, a granular particle is easily obtained. A high heat treatment temperature in synthesis promotes crystal growth to provide a rod-shaped particle. Such a rod-shaped particle causes cracking to easily occur due to expansion and contraction along with a charge-and-discharge cycle. As a result, an electronically conductive network can be blocked in an electrode to result in a decrease in cycle life. A proper range of $0 \le w \le 0.01$ enables the niobium titanium composite oxide particles to have a granular shape and enables an electronically conductive network to be maintained by the carbon fibers covering the at least one part of the surfaces of the particles, resulting in great enhancements in cycle life performance and discharge rate performance.

Expression (3): $0.001 \le w \le 0.005$ is desirably satisfied. Thus, not only a side reaction due to the element M can be suppressed, but also an electronically conductive network can be inhibited from being broken due to particle cracking along with inserted in and extracted from of lithium ions.

The value of ($\gamma/\sigma$) in the expression (2) desirably satisfies expression (4); $1.5/10000 \le (\gamma/\sigma) \le 1/1000$. Thus, an electronically conductive network of active material particles is made favorable, resulting in enhancements in cycle life performance and discharge rate performance.

The expression (3) and the expression (4) are satisfied to thereby allow an electronically conductive network of active material particles to be more improved, resulting in an increase in the effects of enhancements in cycle life performance and discharge rate performance.

Hereinafter, the active material will be described in detail.

The monoclinic niobium titanium composite oxide particles satisfy expression (1); $1.5 \le (\alpha/\beta) \le 2.5$, wherein $\alpha$ represents a number of mole of Nb in the niobium titanium composite oxide particles and $\beta$ represents a number of mole of Ti in the niobium titanium composite oxide particles. A larger value of ($\alpha/\beta$), although enables the active material to be enhanced in capacity, causes a decrease in electronic conductivity of the niobium titanium composite oxide. In order to achieve favorable electronic conductivity and a high capacity, the value of ($\alpha/\beta$) preferably ranges within the expression (1). The value of ($\alpha/\beta$) desirably satisfies $0.8 \le (\alpha/\beta) \le 1.9$. This range allows a niobium titanium composite oxide including not only monoclinic $Li_xTiNb_2O_7$ or $Na_xTiNb_2O_7$, but also a titanium oxide phase (for example, rutile type $TiO_2$ or TiO) to be obtained, thereby imparting enhanced electronic conductivity of the composite oxide and excellent large current discharge performance.

The monoclinic niobium titanium composite oxide particles may be primary particles or may be secondary particles obtained by aggregation of primary particles, and are preferably primary particles. The reason is because the carbon fibers are more uniformly dispersed in the niobium titanium composite oxide particles.

The monoclinic niobium titanium composite oxide particles desirably have an average primary particle size in the range of 0.05 μm or more and 2 μm or less. Such a particle size allows resistance along with diffusion of Li ions and Na ions in the particles to be decreased, resulting in great enhancements in large current discharge performance and rapid charge performance. The average primary particle size can be 0.05 μm or more to thereby allow high crystallinity to be obtained, thereby allowing a high capacity to be obtained. A more preferable lower limit of the average primary particle size is 0.1 μm. The niobium titanium composite oxide particles more preferably have an average primary particle size of 0.5 μm or less. Herein, the primary particle size can be a particle diameter.

The average primary particle size of the niobium titanium composite oxide particles is measured by, for example, the following method: a laser diffraction particle size analyzer (laser diffraction particle size analyzer SAID-300 manufactured by Shimadzu Corporation) is used and measurement is made by first adding about 0.1 g of a sample, a surfactant, and 1 to 2 mL of distilled water into a beaker and sufficiently stirring the resulting mixture and thereafter injecting the mixture into a stirring water bath, subjecting the resultant to measurement of a luminous intensity distribution at an interval of 2 seconds 64 times, and analyzing particle size distribution data. The average primary particle size is measured after the carbon fibers are separated from the niobium titanium composite oxide particles. The separation method will be described below.

The monoclinic niobium titanium composite oxide is desirably represented by $Li_xTiM_wNb_{2\pm y}O_{7\pm z}$ ($0 \le x \le 5$, $0 \le y \le 0.5$, $-0.3 \le z \le 0.3$ and $0 \le w \le 0.01$ are satisfied, and M represents at least one metal other than Ti and Nb).

The amount x of Li in the monoclinic niobium titanium composite oxide can vary due to insertion and extraction of lithium ions in charge and discharge. The monoclinic niobium titanium composite oxide may contain no lithium in synthesis. Such a monoclinic niobium titanium composite oxide containing no lithium in synthesis can store lithium therein due to insertion and extraction of lithium ions in charge and discharge.

Examples of M include at least one metal element selected from the group consisting of K and Ta. Metal elements such as K and Ta each serve as a flux, and thus can allow the niobium titanium composite oxide to be synthesized by a low-temperature heat treatment. As a result, a granular particle is easily obtained. A proper range of $0 \le w \le 0.01$ enables the niobium titanium composite oxide particles to have a granular shape and enables an electronically conductive network to be maintained by the carbon fibers covering the particle surfaces, resulting in great enhancements in cycle life performance and discharge rate performance. Expression (3): $0.001 \leq w \leq 0.005$ is desirably satisfied. Thus, not only a side reaction due to the element M can be suppressed, but also an electronically conductive network can be inhibited from being broken due to particle cracking along with insertion and extraction of lithium ions.

y is in the range of 0 or more and 0.5 or less. If y is out of the range, phase separation may be caused beyond the solid-solution limit, resulting in a decrease in electrode capacity. A more preferable range satisfies $0.05 \leq y \leq 0.2$.

z varies depending on the reduction state of the monoclinic niobium titanium composite oxide. If z exceeds −0.3, not only niobium is reduced in advance to result in a decrease in electrode performance, but also phase separation may be caused. On the other hand, z of up to +0.3 is in the measurement error.

The monoclinic niobium titanium composite oxide can include at least one selected from the group consisting of Mg, Al, V, Fe, Mo, Sn and W.

The carbon fibers contains one or more metal elements selected from the group consisting of Fe, Co and Ni and satisfies the following expression (2).

$$1/10000 \leq (\gamma/\sigma) \leq 1/100 \quad (2)$$

$\gamma$ represents the weight of all the metal elements in the carbon fibers and $\sigma$ represents the weight of carbon in the carbon fibers.

Examples of the carbon fibers containing the metal element(s) include a vapor-grown carbon fibers containing the metal element(s) as a catalyst. Examples of the vapor-grown carbon fibers include multi-layer carbon nanotubes and mono-layer carbon nanotubes. A preferable metal element as the metal element(s) described above is Fe or Co, or includes both Fe and Co.

A value of $(\gamma/\sigma)$ of less than $1/10000$ makes it difficult to uniformly disperse the carbon fibers in the niobium titanium composite oxide particles to thereby cover the surfaces of the particles therewith, resulting in a decrease in cycle life performance. On the other hand, a value of $(\gamma/\sigma)$ of more than $1/100$ causes the ratio of the fiber length to the fiber diameter (fiber length/fiber diameter) to be out of a proper range, thereby making it difficult to disperse the carbon fibers in an electrode and making it difficult to thereby cover the surfaces of the niobium titanium composite oxide particles, resulting in a decrease in cycle life performance. The value of $(\gamma/\sigma)$ more preferably satisfies expression (4); $1.5/10000 \leq (\gamma/\sigma) \leq 1/1000$. The content of the metal element described above can be adjusted by an acid treatment or the like.

The expression (3) and the expression (4) are satisfied to thereby allow an electronically conductive network of active material particles to be more improved, resulting in an increase in the effects of enhancements in cycle life performance and discharge rate performance.

The carbon fibers have an average fiber diameter in the range of 5 nm or more and 100 nm or less. An average fiber diameter of less than 5 nm or more than 100 nm makes it difficult to uniformly disperse the carbon fibers in the niobium titanium composite oxide particles to thereby cover the surfaces of the niobium titanium composite oxide particles. A more preferable average fiber diameter is in the range of 10 nm or more and 90 nm or less.

The ratio of the carbon fibers to be added (the ratio of the weight of the carbon fibers to the weight of the niobium titanium composite oxide particles, carbon fibers/niobium titanium composite oxide particles) is preferably in the range of 0.1% by weight or more and 5% by weight or less. This range enables an electronically conductive network to be uniform and enables a high electrode density to be maintained, resulting in a reduction in electrode resistance and an enhancement in electrode volumetric capacity. A more preferable range is a range of 0.2% by weight or more and 3% by weight or less.

The ratio of the fiber length to the fiber diameter (fiber length/fiber diameter) of the carbon fibers is preferably 10 or more and 1000 or less. This range enables an electronically conductive network to be uniform and enables a high electrode density to be maintained, resulting in a reduction in electrode resistance and an enhancement in electrode volumetric capacity. A more preferable range is a range of 100 or more and 800 or less.

The active material of the embodiment can be produced by, for example, the following method. First, starting raw materials are mixed. A starting raw material of the niobium titanium composite oxide, used here, is an oxide or salt containing Li, Ti and Nb. A salt used as a starting raw material for other element to be added of the niobium titanium composite oxide is preferably a salt which is to be decomposed at a relatively low melting point to produce an oxide, such as a hydroxide salt, a carbonate, or a nitrate. In order to decrease the primary particle size, a powder having an average particle size of 2 µm or less, preferably an average particle size of 0.5 µm or less is preferably used for such a starting raw material.

The starting raw materials are mixed at a ratio so that the molar ratio $(\alpha/\beta)$ satisfies $1.5 \leq (\alpha/\beta) \leq 2.5$. Such other element M to be added (at least one metal other than Ti and Nb, preferably at least one element selected from the group consisting of K and Ta) is preferably mixed at a molar ratio so as to allow the entire charge of a crystal, where Nb is partially replaced with such an element M, to be kept neutral. Thus, an active material including a monoclinic niobium titanium composite oxide represented by $TiM_wNb_{2\pm y}O_{7\pm z}$ ($0 \leq y \leq 0.5$, $0 \leq w \leq 0.01$ and $-0.3 \leq z \leq 0.3$ are satisfied, and M represents at least one metal other than Ti and Nb) can be obtained. On the other hand, even a method of addition where the entire charge is not kept neutral provides $TiM_wNb_{2\pm y}O_{7\pm z}$ by adjustment of the amount added.

Next, the resulting mixture is pulverized to provide a uniform mixture as much as possible. Next, such a mixture obtained is heated. The heat treatment is performed in a temperature range from 500 to 1200° C., more preferably a temperature range from 700 to 1000° C. The heat treatment temperature can be 1000° C. or less to thereby allow for use of existing facilities. The method can provide a powder including a monoclinic niobium titanium composite oxide represented by $TiM_wNb_{2\pm y}O_{7\pm z}$, having an average primary particle size of 2 µm or less. A hydrothermal synthesis method can be used to provide a powder of a monoclinic niobium titanium composite oxide having an average primary particle size of 1 µm or less. Lithium ions are electrochemically inserted in this niobium titanium composite oxide after making an electrode containing the niobium titanium composite oxide thereby providing a crystal where a crystal structure of $Li_xTiM_wNb_{2\pm y}O_{7\pm z}$ ($0 \leq x \leq 5$, preferably $0 < x \leq 5$) is maintained in a battery charged state.

The method for covering the surfaces of the niobium titanium composite oxide particles with the carbon fibers involves adding a powder of the carbon fibers to an aqueous solution to stir and mix the resultant, thereby producing a dispersion solvent where the powder is uniformly dispersed at a predetermined concentration, thereafter adding the niobium titanium composite oxide particles to the dispersion solvent to stir and mix the resultant, and thereafter adding a binder (for example, a cellulose nanofiber, carboxymethyl cellulose, or styrene-butadiene rubber), a conductive agent (for example, a carbon material such as graphite, a carbon fiber or acetylene black) to stir and mix the resultant, thereby producing a slurry. In particular, a cellulose nanofiber is preferably used as the binder because the dispersion state of the carbon fibers is improved to uniformize covering of the surfaces of the niobium titanium oxide particles, resulting in a reduction in electrode resistance.

A current collector is coated with the slurry, and the resultant is dried and pressed, thereby forming an active material-containing layer on the current collector to provide an electrode. The active material-containing layer is observed with an electron microscope (for example, Scanning Electron Microscope, SEM), and it can be thus confirmed that carbon fibers having an average fiber diameter of 5 nm or more and 100 nm or less have adhesion to at least a part of the surfaces of the niobium titanium composite oxide particles, for example, are integrated to at least a part of the surfaces of the niobium titanium composite oxide particles by the binder, the metal, or the like. An example of a SEM photograph is shown in Examples.

First, when the electrode including the active material is included in a secondary battery, the electrode is taken out by the following method. Here, a case where the electrode is a negative electrode is described by way of example. First, the secondary battery is discharged. Specifically, the secondary battery is discharged by discharging to the lower limit discharge voltage at a current value of 0.2 C or less under an environment of 25° C. The battery discharged is placed in a glove box filled with an argon gas. The objective electrode (for example, negative electrode) is taken out from the battery in the glove box. The electrode taken out is washed with an ethyl methyl ether solvent. Thus, an electrode sample is obtained.

The method of quantitatively analyzing the amount of the metal element present in the carbon fibers by use of the resulting electrode sample, and the method of calculating the average fiber diameter of the carbon fibers by use of the resulting electrode sample are described below.

Such an electrode sample is subjected to an ultrasonic treatment to thereby allow the carbon fibers and the niobium titanium composite oxide particles to be released from the current collector and allow the carbon fibers to be isolated by use of centrifugation. The type of a solvent for use in such isolation is changed depending on the type of the binder included in the electrode. For example, when carboxymethyl cellulose (CMC) or styrene-butadiene rubber (SBR) is included as the binder, water is used for an isolation solvent. On the other hand, when polyvinylidene fluoride (PVdF) is included as the binder, an organic solvent such as n-methyl pyrrolidone (NMP) is used for an isolation solvent. Such isolation allows the niobium titanium composite oxide particles and the carbon fibers to be separated.

The carbon fibers isolated by the above method are subjected to IPC (ICP-MS: Inductively Coupled Plasma-Mass Spectrometry) to determine the weight of carbon in the carbon fibers and the weight of the metal element in the carbon fibers.

The carbon fibers isolated by the above method is observed with a scanning electron microscope (SEM) at a magnification of 10000, to measure the width (diameter) at each position of 25%, 50% and 75% of the entire length of the carbon fibers in the field of view. The average of the width values measured is defined as an average fiber diameter to be determined. The measurement is performed with the entire carbon fibers present in the field of view being targeted.

The molar ratio of Ti and Nb elements in the niobium titanium composite oxide particles isolated by the above method is obtained by performing ICP (Inductively Coupled Plasma) analysis. The ICP analysis can be made by, specifically, metering the niobium titanium composite oxide particles serving as a sample, in a Pt crucible, decomposing it by alkaline fusion, to produce a measurement solution, and then quantitatively measuring the amounts of Nb and Ti by ICP emission spectrometry using an internal standard method, for example, with an ICP optical emission spectrophotometer (Hitachi High-Tech Science Corporation) SPS-4000).

The average primary particle size of the niobium titanium composite oxide particles isolated by the above method is measured by the above-mentioned method.

According to the active material of the first embodiment described above, monoclinic niobium titanium composite oxide particles which satisfy expression (1) and which have an average primary particle size of 0.05 μm or more and 2 μm or less, and carbon fibers which contain one or more metal elements selected from the group consisting of Fe, Co and Ni, which satisfy expression (2), and which have an average fiber diameter in the range of 5 nm or more and 100 nm or less are included, thereby enabling an active material for an electrode or a secondary battery, excellent in large-current performance and cycle life performance, to be provided.

Second Embodiment

According to the second embodiment, an electrode is provided. The electrode includes the active material of the first embodiment. The electrode includes a current collector, and an active material-containing layer which is held on at least a main surface of the current collector and which includes an active material and a binder, and, if necessary, a conductive agent.

The active material may be only the active material according to the first embodiment, or may include other active material than the active material.

Examples of such other active material include metal oxide, metal sulfide, metal fluoride, and metal nitride. A titanium-containing metal oxide is preferable from the viewpoint of an improvement in cycle life performance. Examples of the titanium-containing metal oxide include lithium-titanium-containing oxide and titanium-containing oxide. Examples of the lithium-titanium-containing oxide include such an oxide having a spinel structure (for example, general formula $Li_{4/3+a}Ti_{5/3}O_4$ ($0 \leq a \leq 2$)), such an oxide having a ramsdellite structure (for example, general formula $Li_{2+a}Ti_3O_7$ ($0 \leq a \leq 1$), $Li_{1+b}Ti_2O_4$ ($0 \leq b \leq 1$), $Li_{1.1+b}Ti_{1.8}O_4$ ($0 \leq b \leq 1$), and $Li_{1.07+b}Ti_{1.86}O_4$ ($0 \leq b \leq 1$)), and a lithium-titanium-containing composite oxide containing at least one element selected from the group consisting of Nb, Mo, W, P, V, Sn, Cu, Ni and Fe. Examples of the lithium-titanium-containing oxide include a lithium-titanium-containing composite oxide represented by $Li_{2+a}A_dTi_{6-b}B_bO_{14-c}$ (wherein A represents one or more elements selected from the group consisting of Na, K, Mg, Ca and Sr, B represents a metal element other than Ti, and $0 \leq a \leq 5$, $0 \leq b \leq 6$, $0 \leq c \leq 0.6$ and $0 \leq d \leq 3$ are satisfied). The crystal structure of the lithium-titanium-containing composite oxide can be a crystal structure of a space group Cmca.

The titanium-containing oxide can be represented by general formula $Li_aTiO_2$ ($0 \leq a \leq 2$). In such a case, the compositional formula before charge is $TiO_2$. Examples of such titanium oxide include titanium oxide having a monoclinic structure (bronze structure (B)), titanium oxide having a rutile structure, and titanium oxide having an anatase structure. $TiO_2$ (B) having a monoclinic structure (bronze structure (B)) is preferable, and low crystalline titanium oxide to be heat-treated at a temperature of 300 to 600° C. is preferable.

The active material preferably has a granulate particle shape, and may include a fibrous particle.

The electrode desirably has a degree of porosity (except for the current collector) in the range of 20 to 50%. Thus, an electrode can be obtained which is excellent in affinity with a nonaqueous electrolyte and high in density. A further preferable range of the degree of porosity is from 25 to 50%.

Examples of the current collector include nickel foil, copper foil, stainless steel foil, aluminum foil and aluminum alloy foil. The current collector is desirably aluminum foil or aluminum alloy foil. The aluminum foil preferably has a purity of 99.99% or more. The aluminum alloy is preferably an alloy containing an element such as magnesium, zinc or silicon. On the other hand, the content of a transition metal such as iron, copper, nickel or chromium is preferably 100 ppm or less. Not only such a foil-shaped current collector, but also a mesh-shaped current collector can also be used.

The current collector preferably has a thickness of 20 μm or less, more preferably 15 μm or less.

The conductive agent to be used can be, for example, acetylene black, carbon black, coke (desirably, which has an average particle size of 10 μm or less and which is to be heat-treated at a temperature of 800° C. to 2000° C.), a carbon nanotube, a carbon fiber, graphite, a metal compound powder such as TiO, TiC or TiN, and a metal powder such as Al, Ni, Cu or Fe, and such conductive agents may be used singly or as a mixture of two or more thereof. A carbon nanotube or a carbon fiber having a fiber diameter of 1 μm or less is used to result in a reduction in electrode resistance and an enhancement in cycle life performance.

Examples of the binder include polytetrafluoroethylene (PTFE), polyvinylidene fluoride (PVdF), fluororubber, acrylic rubber, styrene-butadiene rubber (SBR), cellulose nanofiber (CeNF), carboxymethyl cellulose (CMC), a core-shell binder and polyimide. Such binders can be adopted singly or in combinations of two or more thereof.

The ratio of the active material, the conductive agent and the binder compounded in the active material-containing layer is preferably the following ranges: 90 to 99% by weight of the active material, 0 to 8% by weight of the conductive agent and 2 to 7% by weight of the binder.

The respective BET specific surface areas of the active material and the electrode by $N_2$ adsorption can be measured in the following conditions, for example. A sample is obtained by weighting 1 g of the active material in the form of a powder or cutting the electrode to provide two sections having a size of 2×2 cm². The BET specific surface area measurement apparatus here used is manufactured by Yuasa Ionics Co., Ltd., and a nitrogen gas is used as an adsorption gas.

The degree of porosity of the electrode is calculated by comparing the volume of the active material-containing layer with the volume of the active material-containing layer at a degree of porosity of 0%, and estimating an increase relative to the volume of the active material-containing layer at a degree of porosity of 0%, as a pore volume. Herein, when the active material-containing layer is formed on each of both surfaces of the current collector, the volume of the active material-containing layer is assumed to be the total volume of the active material-containing layers on such both surfaces.

The electrode can be obtained by, for example, the method described in the first embodiment.

According to the electrode of the second embodiment, an electrode excellent in capacity, large-current performance and cycle life performance can be obtained because the electrode includes the active material of the first embodiment.

Third Embodiment

According to the third embodiment, a secondary battery is provided which includes a positive electrode, a negative electrode, and a nonaqueous electrolyte. The electrode of the second embodiment can be used as the positive electrode or the negative electrode. Here, an example is described where the electrode is used as the negative electrode. The secondary battery of the third embodiment can include a separator disposed between the positive electrode and the negative electrode, and can further include a container that receives these electrodes and the nonaqueous electrolyte.

Hereinafter, the positive electrode, the nonaqueous electrolyte, the separator, and the container will be described.

(Positive Electrode)

The positive electrode include a positive electrode current collector, and a positive electrode active material-containing layer which is held on a surface or both surfaces, or at least a main surface of both main surfaces of the current collector, and which includes an active material, a conductive agent and a binder.

Examples of the positive electrode active material include a Ni-containing lithium metal oxide, lithium manganese oxide having a spinel structure, lithium cobalt composite oxide, lithium nickel composite oxide, lithium nickel cobalt composite oxide, lithium cobalt aluminum composite oxide, lithium nickel aluminum composite oxide, lithium nickel cobalt manganese composite oxide, lithium manganese nickel composite oxide having a spinel structure, lithium manganese cobalt composite oxide, a lithium-containing phosphate compound having an olivine structure, fluorinated iron sulfate and lithium nickel cobalt manganese composite oxide. In addition, graphite or a carbon material into which an anion in the nonaqueous electrolyte is inserted, or activated carbon having capacitor capacity can be used as the positive electrode. Such positive electrode active materials can be used singly or in combinations of two or more thereof.

Examples of the lithium manganese composite oxide having a spinel structure include $Li_xMn_2O_4$ ($0<x \leq 1$), $Li_xMnO_2$ ($0<x \leq 1$) and $LiMn_{1.5}Ni_{0.5}O_4$.

Examples of the lithium cobalt composite oxide include $Li_xCoO_2$ ($0<x \leq 1$).

Examples of the lithium nickel aluminum composite oxide include $Li_xNi_{1-y}Al_yO_2$ ($0<x \leq 1$, $0<y \leq 1$).

Examples of the lithium nickel cobalt composite oxide include $Li_xNi_{1-y-z}Co_yMn_zO_2$ ($0<x \leq 1$, $0<y \leq 1$, $0 \leq z \leq 1$, $0<1-y-z<1$).

Examples of the lithium manganese cobalt composite oxide include $Li_xMn_yCo_{1-y}O_2$ ($0<x \leq 1$, $0<y<1$).

Examples of the lithium manganese nickel composite oxide having a spinel structure include $Li_xMn_{2-y}Ni_yO_4$ ($0<x\leq1$, $0<y<2$).

Examples of the lithium-containing phosphate compound having an olivine structure include $Li_xFePO_4$ ($0<x\leq1$), $Li_xFe_{1-y}Mn_yPO_4$ ($0<x\leq1$, $0\leq y\leq1$), $Li_xCoPO_4$ ($0<x\leq1$), $Li_xMnPO_4$ ($0<x\leq1$) and $LiMn_{1-x-y}Fe_xMg_yPO_4$ ($0\leq x\leq 0.5$ and $0\leq y\leq 0.5$).

Examples of the fluorinated iron sulfate include $Li_xFeSO_4F$ ($0<x\leq1$).

Examples of the lithium nickel cobalt manganese composite oxide include $Li_xNi_{1-y-z}Co_yMn_zO_2$ ($0<x\leq1.1$, $0<y\leq0.5$, $0<z\leq0.5$, $0<1-y-z<1$).

Examples of the Ni-containing lithium metal oxide include lithium nickel oxide (for example, $LiNiO_2$), lithium nickel cobalt oxide (for example, $LiNi_aCo_{1-a}O_2$), lithium nickel cobalt aluminum oxide (for example, $LiNi_aCo_bAl_{1-a-b}O_2$) and lithium nickel cobalt manganese oxide (for example, $LiNi_aCO_bMn_{1-a-b}O_4$ provided that $0<a<1$, $0<b<1$, and $0<(1-a-b)<1$ are satisfied). When the Ni-containing lithium metal oxide is represented by general formula $LiN_{i_x}M_{1-x}O_2$ (wherein M represents at least one metal other than Ni), x is preferably in the range of 0.5 or more and 1 or less. An oxide satisfying the range has a high capacity and a high energy density, and thus can be combined with the active material according to the embodiment, resulting in great enhancements in high-temperature cycle life performance, high-output performance and safety performance.

A more preferable positive electrode material is preferably $LiFePO_4$ or $Li_xFe_{1-y}Mn_yPO_4$ in terms of cycle life performance, and is preferably $LiNi_xM_{1-x}O_2$ (wherein M represents at least one metal other than Ni and $0.5\leq x\leq1$ is satisfied) in terms of battery capacity.

At least one element (hereinafter, referred to as "first element") selected from the group consisting of Mg, Al, Ti, Nb, Sn, Zr, Ba, B and C may also be present on at least a part of a surface of a positive electrode active material particle. Such a positive electrode active material can suppress an oxidative decomposition of the nonaqueous electrolyte under a high-temperature environment, and thus can suppress an increase in resistance. Thus, the secondary battery can be greatly enhanced in high-temperature cycle life performance.

The first element, preferably, is provided in the form of a metal oxide particle and/or a phosphorus oxide particle having a particle size of 0.001 to 1 μm, or is in the form of a metal oxide layer and/or a phosphorus oxide layer to cover at least a part of the surface of the positive electrode active material particle with such layer(s). Alternatively, the first element may be in the form of a solid-solution in a surface layer of the positive electrode active material particle. Examples of the metal oxide include MgO, $Al_2O_3$, SnO, $ZrO_2$, $TiO_2$, BaO and $B_2O_3$. Examples of the phosphorus oxide include $AlPO_4$, $Mg_3(PO_4)_2$ and $Sn_3(PO_4)_2$. When C is used as the first element, carbon particles having an average particle of 1 μm or less is preferably formed on the surface of the active material. The respective amounts of the metal oxide of the first element and the phosphorus oxide of the first element, and the carbon particles are preferably 0.001 to 3% by weight relative to the positive electrode active material.

The positive electrode active material particles may be in the form of primary particles or may be secondary particles obtained by aggregation of primary particles.

Primary particles and secondary particles may also be present with being mixed.

The positive electrode active material particles can have an average primary particle size of 0.05 μm or more and 3 μm or less. The positive electrode active material particles can have an average secondary particle size of 3 μm or more and 20 μm or less.

The conductive agent can enhance electronic conductivity and suppress contact resistance with the current collector. Examples of the conductive agent include acetylene black, carbon black, a carbon nanotube, a carbon fiber and graphite.

The binder can bind the active material and the conductive agent. Examples of the binder include polymers such as polytetrafluoroethylene (PTFE), polyvinylidene fluoride (PVdF), fluororubber, styrene-butadiene rubber, carboxymethyl cellulose (CMC) and an acrylic material. The binder can impart flexibility to an active material-containing layer including a polymer fiber. PVdF and styrene-butadiene rubber are excellent in the effect of enhancing flexibility, respectively.

The ratio of the positive electrode active material, the conductive agent and the binder compounded is preferably the following ranges: 80 to 95% by weight of the positive electrode active material, 3 to 19% by weight of the conductive agent and 1 to 7% by weight of the binder.

The positive electrode is produced by, for example, suspending the positive electrode active material, the conductive agent and the binder in a proper solvent, coating a current collector including aluminum foil or aluminum alloy foil with such the suspension, and drying and pressing the resultant. The positive electrode active material-containing layer preferably has a specific surface area in the range of 0.1 to 2 $m^2/g$ according to a BET method.

The current collector is preferably aluminum foil or aluminum alloy foil. The thickness of the current collector can be 20 μm or less and is more preferably 15 μm or less.

(Nonaqueous Electrolyte)

Examples of the nonaqueous electrolyte include a liquid organic electrolyte prepared by dissolving an electrolyte in an organic solvent, a gel-like organic electrolyte as a composite of a liquid organic solvent and a polymer material, or a solid nonaqueous electrolyte as a composite of a lithium salt electrolyte and a polymer material. A lithium-ion-containing room temperature molten salt (ionic melt) may also be used in the nonaqueous electrolyte. Examples of the polymer material can include polyvinylidene fluoride (PVdF), polyacrylonitrile (PAN) and polyethylene oxide (PEO).

The liquid organic electrolyte is prepared by dissolving an electrolyte at a concentration of 0.5 to 2.5 mol/L in an organic solvent.

The electrolyte here used can be a lithium salt or a sodium salt. Examples include $LiBF_4$, $LiPF_6$, $LiAsF_6$, $LiClO_4$, $LiCF_3SO_3$, $LiN(CF_3SO_2)_2$, $LiN(C_2F_5SO_2)_2$, $Li(CF_3SO_2)_3C$ and $LiB[(OCO)_2]_2$. Such electrolytes can be used singly or in combinations of two or more thereof. In particular, at least one of lithium tetrafluoroborate ($LiBF_4$) and lithium hexafluorophosphate ($LiPF_6$) is preferably included. Thus, the organic solvent is enhanced in chemical stability, film resistance on the negative electrode can be decreased, and low-temperature performance and cycle life performance can be greatly enhanced.

Examples of the organic solvent can include cyclic carbonates such as propylene carbonate (PC) and ethylene carbonate (EC), chain carbonates such as diethyl carbonate (DEC), dimethyl carbonate (DMC) and methylethyl carbonate (MEC), chain ethers such as dimethoxyethane (DME) and diethoxyethane (DEE), cyclic ethers such as tetrahydrofuran (THF) and dioxolane (DOX), γ-butyrolactone (GBL), acetonitrile (AN), and sulfolane (SL). Such organic solvents can be used singly or as a mixture of two or more thereof. In particular, such an organic solvent preferably mainly contains one or more selected from the group consisting of propylene carbonate (PC), ethylene carbonate (EC) and γ-butyrolactone (GBL) because a boiling point of 200° C. or more and thus high heat stability are achieved. In particular, such an organic solvent preferably contains γ-butyrolactone (GBL) because output performance under a low-temperature environment is also enhanced. A lithium salt dissolved at a high concentration can be used and thus such a lithium salt is preferably dissolved in the range of 1.5 to 2.5 mol/L in the organic solvent. The reason is because a high output can be thus provided even under a low-temperature environment. The concentration of the lithium salt can be 1.5 mol/L or more to thereby allow a rapid decrease in lithium ion concentration at the interface between the positive electrode and the electrolyte in discharge at a large current to be avoided and allow a great decrease in output to be suppressed. On the other hand, the concentration of the lithium salt can be 2.5 mol/L or less to result in a lowered viscosity of the nonaqueous electrolyte and thus an increased speed of movement of lithium ions, thereby allowing a high output to be obtained.

The room temperature molten salt (ionic melt) is preferably configured from a lithium ion or a sodium ion, and an organic cation and an organic anion. The room temperature molten salt is desirably in the form of a liquid at room temperature or less.

Hereinafter, an electrolyte including the room temperature molten salt will be described.

The room temperature molten salt refers to a salt which is at least partially in the form of a liquid at room temperature, and the room temperature refers to a temperature in a range where a power source is expected to be commonly operated. Such a temperature range where a power source is expected to be commonly operated has an upper limit of about 120° C., optionally about 60° C., and has a lower limit of about −40° C., optionally about −20° C. In particular, a range of −20° C. or more and 60° C. or less is suitable.

The lithium-ion-containing room temperature molten salt to be used is desirably an ionic melt configured from a lithium ion and organic cation and anions. The ionic melt is preferably in the form of a liquid even at room temperature or less.

Examples of the organic cation include an alkylimidazolium ion and a quaternary ammonium ion each having a backbone represented by formula 1 below.

[Formula 1]

The alkylimidazolium ion is preferably a dialkylimidazolium ion, a trialkylimidazolium ion, a tetraalkylimidazolium ion or the like. The dialkylimidazolium is preferably a 1-methyl-3-ethylimidazolium ion (MEI$^+$). The trialkylimidazolium ion is preferably a 1,2-diethyl-3-propylimidazolium ion (DMPI). The tetraalkylimidazolium ion is preferably a 1,2-diethyl-3,4(5)-dimethylimidazolium ion.

The quaternary ammonium ion is preferably a tetraalkylammonium ion, a cyclic ammonium ion or the like. The tetraalkylammonium ion is preferably a dimethylethylmethoxyethylammonium ion, a dimethylethylmethoxymethylammonium ion, a dimethylethylethoxyethylammonium ion or a trimethylpropylammonium ion.

The alkylimidazolium ion or the quaternary ammonium ion (in particular tetraalkylammonium ion) can be used to thereby allow the melting point to be 100° C. or less, more preferably 20° C. or less, and furthermore allow reactivity with the negative electrode to be decreased.

The concentration of the lithium ion is preferably 20 mol % or less. A more preferable range is the range of 1 to 10 mol %. This range can allow the liquid room temperature molten salt to be easily formed even at a low temperature of 20° C. or less. A temperature equal to or less than room temperature can also allow for a decrease in viscosity and an increase in ion conductivity.

The anion preferably coexists with one or more anions selected from the group consisting of $BF_4^-$, $PF_6^-$, $AsF_6^-$, $ClO_4^-$, $CF_3SO_3^-$, $CF_3COO^-$, $CH_3COO^-$, $CO_3^{2-}$, $(FSO_2)_2N^-$, $N(CF_3SO_2)_2^-$, $N(C_2F_5SO_2)_2^-$, $(CF_3SO_2)_3C^-$ and the like. A plurality of anions can coexist to thereby easily form a room temperature molten salt having a melting point of 20° C. or less. Examples of a more preferable anion include $BF_4^-$, $(FSO_2)_2^-$, $CF_3SO_3^-$, $CF_3COO^-$, $CH_3COO^-$, $CO_3^{2-}$, $N(CF_3SO_2)_2^-$, $N(C_2F_5SO_2)_2^-$ and $(CF_3SO_2)_3C^-$. Such anions more facilitate formation of a room temperature molten salt of 0° C. or less.

(Separator)

The separator can be disposed between the positive electrode and the negative electrode. The examples of separator can include an olefin porous film of polyethylene (PE), polypropylene (PP) or the like, or a cellulose fiber separator. The separator can have a porosity of 50% or more. Furthermore, a separator whose surface is coated with an inorganic powder can also be used.

Such a cellulose fiber desirably has a fiber diameter of 10 μm or less. Examples of the form of such a cellulose fiber separator can include an unwoven fabric, a film and paper. In particular, a cellulose fiber separator having a porosity of 60% or more is favorable in impregnating ability with the nonaqueous electrolyte and can provide high output performance at a temperature from a low temperature to a high temperature. A more preferable porosity is in the range of 62% to 80%. Such a cellulose fiber separator having a porosity of 60% or more can be combined with a negative electrode including the active material according to the first embodiment, thereby allowing for suppression of the reaction of the separator and the negative electrode in long-term charge storage, float charge and over-charge, and avoidance of the problem of short-circuit between the negative electrode and the positive electrode due to dendrite precipitation of a lithium metal. Furthermore, such a cellulose fiber, which has a fiber diameter of 10 μm or less, can result in an enhancement in affinity of the separator and the nonaqueous electrolyte and a decrease in battery resistance. A fiber diameter of 3 μm or less is more preferable.

The separator preferably has a thickness of 10 to 100 μm, preferably 20 to 100 μm, and preferably has a density of 0.2 to 0.9 g/cm$^3$. Such ranges enable the balance between mechanical strength and a reduction in battery resistance to be achieved, and enables a battery high in output and hardly causing internal short-circuit to be provided. In addition, favorable high-temperature storage performance can be achieved with less heat shrinkable under a high-temperature environment.

(Container)

The container that receives the positive electrode, the negative electrode and the nonaqueous electrolyte, to be used, can be a metallic container or a container including a laminate film.

The metallic container to be used can be any container which is a metal can including aluminum, an aluminum alloy, iron, stainless steel or the like and which has a rectangular or cylindrical shape. The container desirably has a plate thickness of 0.5 mm or less, and further preferably a plate thickness in the range of 0.3 mm or less.

Examples of the laminate film can include a multi-layer film where aluminum foil is covered with a resin film. The resin to be used can be a polymer such as polypropylene (PP), polyethylene (PE), nylon or polyethylene terephthalate (PET). The laminate film preferably has a thickness of 0.2 mm or less. The aluminum foil preferably has a purity of 99.5% or more.

The metal can including an aluminum alloy is preferably formed from an alloy including an element such as manganese, magnesium, zinc and/or silicon and having an aluminum purity of 99.8% or less. The metal can including an aluminum alloy can be increased in strength and thus can be thinner in thickness. As a result, a battery can be realized which is thin, light-weight, high in output and excellent in heat dissipation properties.

A cup-molded product having a thin and large-sized shape, processed using stainless steel foil (thickness: 0.1 to 0.3 mm) not covered with any resin film, can be used as the container.

The type of the battery is not limited to a rectangular type, and various types including a cylindrical type, a thin type, a coin type and the like can be adopted. The secondary battery can include an electrode group where the separator is interposed between the positive electrode and the negative electrode. The shape of the electrode group is not limited to a flat shape, and can be, for example, a cylindrical shape or a stacked shape.

The secondary battery can further include a positive electrode terminal electrically connected to the positive electrode of the electrode group and a negative electrode terminal electrically connected to the negative electrode of the electrode group.

(Negative Electrode Terminal)

The negative electrode terminal can be formed from a material which is electrochemically stable at a potential of inserted in and extracted from of Li of the negative electrode active material and which has electrical conductivity. Specific examples of the material of the negative electrode terminal include copper, nickel, stainless steel or aluminum, or an aluminum alloy including at least one element selected from the group consisting of Mg, Ti, Zn, Mn, Fe, Cu and Si. The material of the negative electrode terminal to be used is preferably aluminum or an aluminum alloy. The negative electrode terminal preferably includes a material similar to that of the negative electrode current collector in order to have a reduced contact resistance with the negative electrode current collector.

(Positive Electrode Terminal)

The positive electrode terminal can be formed from a material which is electrically stable in the range of potential (vs. Li/Li$^+$) to a redox potential of lithium, of 3 V or more and 4.5 V or less, and which has electrical conductivity. Examples of the material of the positive electrode terminal include aluminum, or an aluminum alloy including at least one element selected from the group consisting of Mg, Ti, Zn, Mn, Fe, Cu and Si. The positive electrode terminal preferably includes a material similar to that of the positive electrode current collector in order to have a reduced contact resistance with the positive electrode current collector.

The secondary battery of the embodiment can be a secondary battery having a bipolar structure. Thus, an advantage is that a secondary battery having a voltage comparable to that of a secondary battery having a plurality of cells in series can be produced from one cell.

An example of the secondary battery according to the embodiment will be described with reference to FIGS. 1, 2, 3, 4, and 5.

Figure 2:
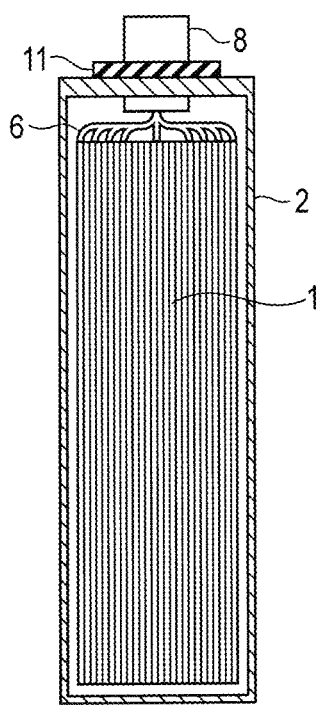
FIG. 2 is a side view of the battery of FIG. 1.

FIGS. 1 and 2 show an example of the secondary battery using a metal container.

An electrode group 1 is stored in a rectangular tubular metal container 2. The electrode group 1 has a structure formed by spirally winding the positive electrode active material-containing layer of a positive electrode 3 and the negative electrode active material-containing layer of a negative electrode 4 with a separator 5 interposing therebetween so as to form a flat shape. The separator 5 covers the surface (principal surface) of the positive electrode active material-containing layer or negative electrode active material-containing layer. As shown in FIG. 2, a strip-shaped positive electrode lead 6 is electrically connected to each of a plurality of portions at an end of the positive electrode 3 located on an end face of the electrode group 1. A strip-shaped negative electrode lead 7 is electrically connected to each of a plurality of portions at an end of the negative electrode 4 located on the end face. The plurality of positive electrode leads 6 are bundled, and in this state, electrically connected to a positive electrode tab 8. A positive electrode terminal is formed from the positive electrode leads 6 and the positive electrode tab 8. In addition, the negative electrode leads 7 are bundled, and in this state, connected to a negative electrode tab 9. A negative electrode terminal is formed from the negative electrode leads 7 and the negative electrode tab 9. A sealing plate 10 made of a metal is fixed to the opening portion of the metal container 2 by welding or the like. The positive electrode tab 8 and the negative electrode tab 9 are extracted to the outside from outlet holes formed in the sealing plate 10, respectively. The inner circumference surface of each outlet hole of the sealing plate 10 is covered with an insulating member 11 to avoid a short circuit caused by contact between the positive electrode tab 8 and the negative electrode tab 9.

Figure 3:
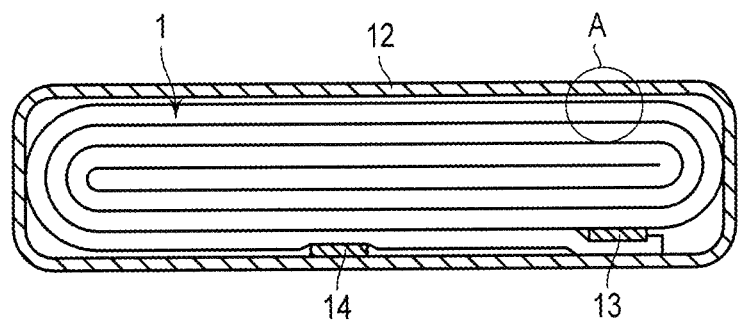
FIG. 3 is a cross-sectional view obtained by cutting a secondary battery of an embodiment in a direction perpendicular to an extending direction of a terminal.
Figure 4:
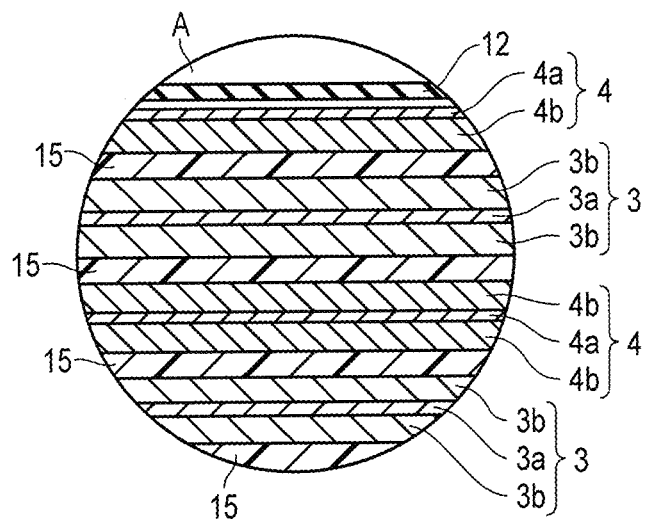
FIG. 4 is an enlarged cross-sectional view of an A portion of FIG. 3.

FIGS. 3 and 4 show an example of a secondary battery using a container member made of a laminated film.

As shown in FIGS. 3 and 4, the flat wound electrode group 1 is stored in a sack-shaped container member 12 made of a laminated film including a metal layer interposing between two resin films. The flat wound electrode group 1 is formed by spirally winding a stacked structure obtained by stacking the negative electrode 4, a separator 15, the positive electrode 3, and the separator 15 from the outside, and pressing the stacked structure. The separator 15 covers the surface (principal surface) of the positive electrode active material-containing layer or negative electrode active material-containing layer. The outermost negative electrode 4 has an arrangement in which a negative electrode layer (negative electrode active material-containing layer) 4b containing a negative electrode active material on one surface on the inner side of a negative electrode current collector 4a, as shown in FIG. 4, and the remaining negative electrodes 4 are arranged by forming the negative electrode layers 4b on both surfaces of the negative electrode current collector 4a. The positive electrode 3 is arranged by forming positive electrode layers (positive electrode active material-containing layers) 3b on both surfaces of a positive electrode current collector 3a.

Near the outer end of the wound electrode group 1, a negative electrode terminal 13 is electrically connected to the negative electrode current collector 4a of the outermost negative electrode 4, and a positive electrode terminal 14 is electrically connected to the positive electrode current collector 3a of the positive electrode 3 on the inner side. The negative electrode terminal 13 and the positive electrode terminal 14 extend outward from the opening portion of the sack-shaped container 12. The opening portion of the sack-shaped container 12 is heat-sealed, thereby sealing the wound electrode group 1. At the time of heat-sealing, the negative electrode terminal 13 and the positive electrode terminal 14 are sandwiched by the sack-shaped container member 12 in the opening portion.

Since the secondary battery of the third embodiment described above includes the active material of the first embodiment or the electrode of the second embodiment, a high capacity, excellent large-current performance and excellent cycle life performance can be achieved.

Fourth Embodiment

A battery module of a fourth embodiment includes the secondary battery of the third embodiment, with the number of the secondary batteries being more than one.

Examples of the battery module can include one including a plurality of single batteries electrically connected in series and/or in parallel as a structural unit, one including a first unit that includes a plurality of single batteries electrically connected in series or a second unit that includes a plurality of single batteries electrically connected in parallel, and the like. The battery module may include at least one form of these configurations.

Examples of the form in which a plurality of secondary batteries is electrically connected in series and/or in parallel include one in which secondary batteries each provided with a container member are electrically connected in series and/or in parallel, and one in which a plurality of battery groups or bipolar electrode bodies are electrically connected in series and/or in parallel, and are stored in a common housing. A specific example of the former is one in which positive electrode terminals and negative electrode terminals of the secondary batteries are connected by bus bar made of metal (for example, aluminum, nickel, or cupper). A specific example of the latter is one in which a plurality of electrode groups or bipolar electrode bodies is stored in one housing in a state of being electrochemically insulated by a partition wall, and the electrode groups or bipolar electrode bodies are electrically connected in series. In a case of a secondary battery, when the number of the batteries electrically connected in series is within a range of 5 to 7, compatibility with voltage of lead storage batteries becomes good. In order to further enhance the compatibility with voltage of lead storage batteries, a configuration in which five or six single batteries are connected in series is preferable.

A metallic can made of aluminum alloy, iron, stainless steel, or the like, a plastic container, and the like can be used as the housing for storing the battery module. In addition, the wall thickness of the housing is desirably 0.5 mm or more.

Figure 5:
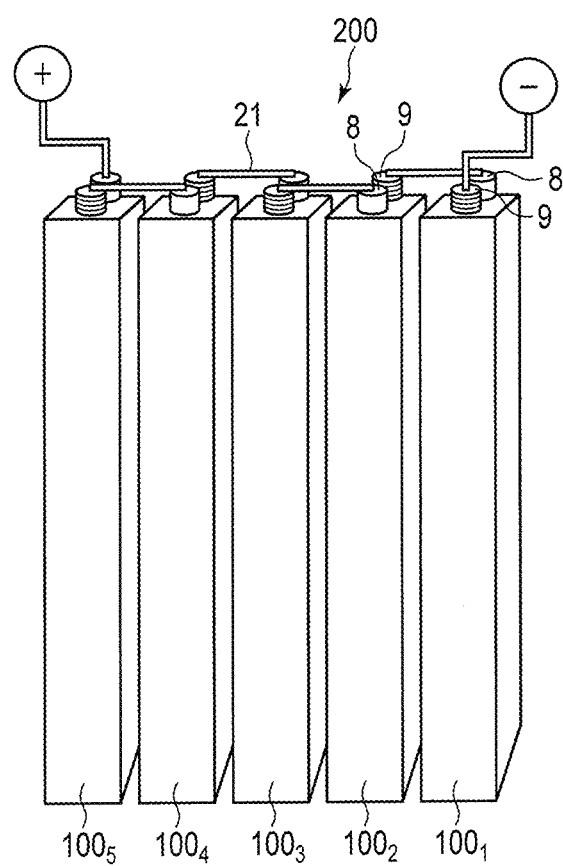
FIG. 5 is a perspective view showing an example of a battery module including a secondary battery of an embodiment.

An example of a battery module will be described with reference to FIG. 5. A battery module 200 shown in FIG. 5 includes, as single batteries, a plurality of rectangular secondary batteries $100_1$ to $100_5$ shown in FIG. 1. A positive electrode tab 8 of the battery $100_1$ and a negative electrode tab 9 of the battery $100_2$ located adjacent to the battery $100_1$ are electrically connected by a lead or bus bar 21. In addition, a positive electrode tab 8 of the battery $100_2$ and a negative electrode tab 9 of the battery $100_3$ located adjacent to the battery $100_2$ are electrically connected by a lead or bus bar 21. The batteries $100_1$ to $100_5$ are thus electrically connected in series.

Since the battery module of the fourth embodiment described above includes the secondary batteries of the third embodiment, high capacity, excellent charge-and-discharge cycle life, and large-current performance can be achieved.

Fifth Embodiment

A battery pack according to a fifth embodiment can include as the single battery the secondary battery according to the third embodiment, with the number of the secondary batteries being one or more than one. A plurality of secondary batteries can also be electrically connected in series, in parallel, or by a combination of serial and parallel connection to configure a battery module. The battery pack according to the fifth embodiment may include a plurality of battery modules.

The battery pack according to the fifth embodiment can further include a protective circuit. The protective circuit has a function of controlling charge-and-discharge of the secondary battery. Alternatively, a circuit included in a device (for example, an electronic device, an automobile, or the like) which uses the battery pack as a power source can be used as the protective circuit of the battery pack.

Moreover, the battery pack according to the fifth embodiment may further include an external power distribution terminal. The external power distribution terminal is configured to externally output current from the battery, and/or to input external current into the battery. In other words, when the battery pack is used as a power source, the current is provided out via the external power distribution terminal. When the battery pack is charged, the charging current (including regenerative energy of motive force of vehicles such as automobiles) is provided to the battery pack via the external power distribution terminal.

Next, an example of a battery pack according to the fifth embodiment will be described with reference to the drawings.

Figure 6:
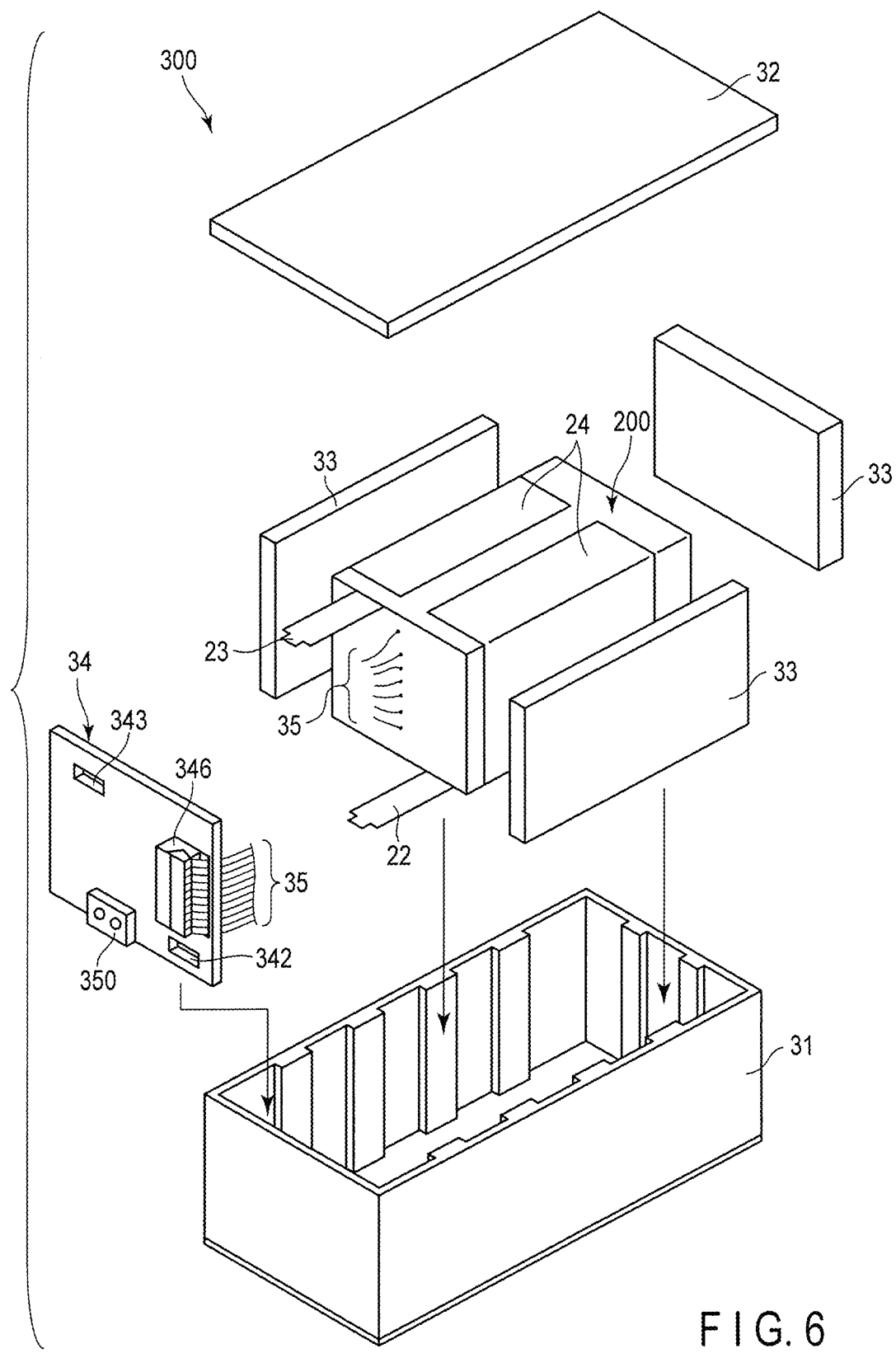
FIG. 6 is an exploded perspective view of a battery pack of an embodiment.
Figure 7:
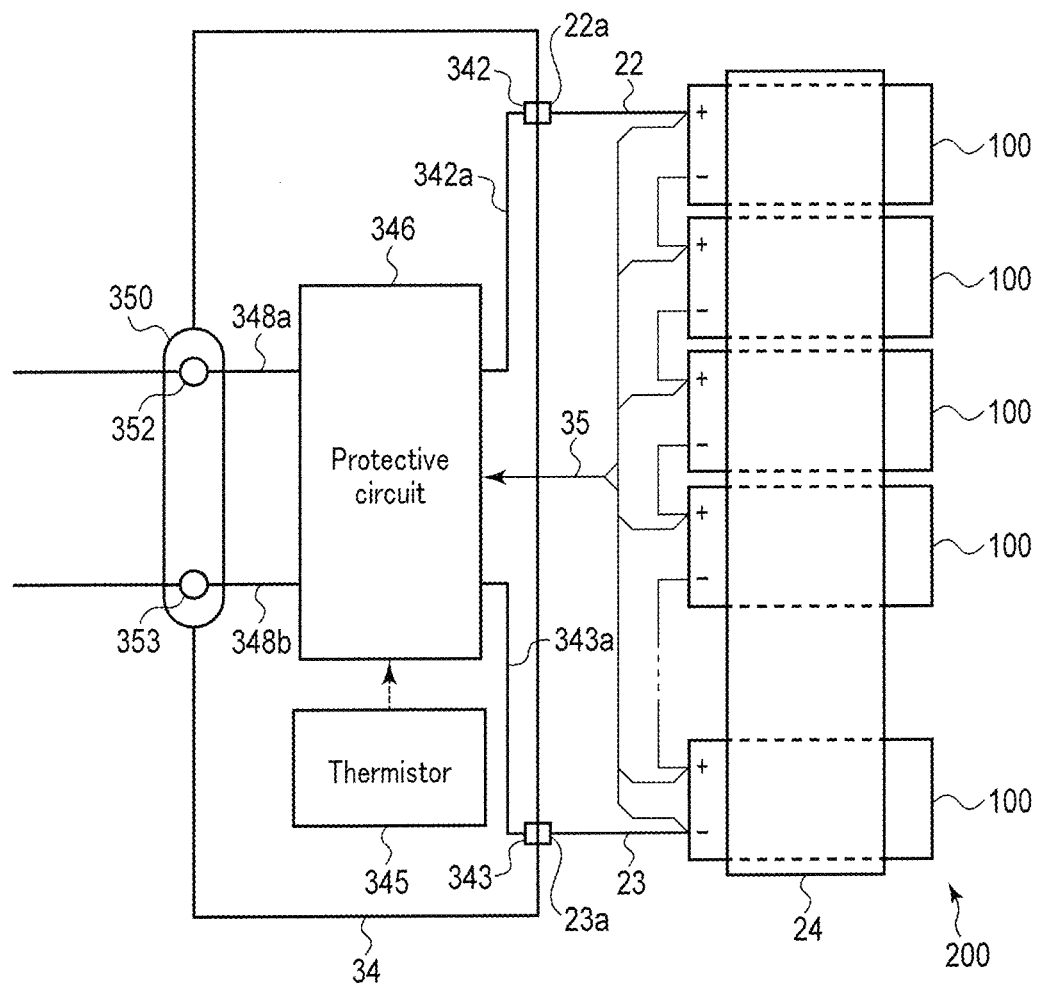
FIG. 7 is a block diagram showing an electric circuit of the battery pack of FIG. 6.

FIG. 6 is an exploded perspective view schematically showing an example of the battery pack according to the fifth embodiment. FIG. 7 is a block diagram showing an example of an electric circuit of the battery pack shown in FIG. 6.

A battery pack 300 shown in FIGS. 6 and 7 includes a housing container 31, a lid 32, protective sheets 33, a battery module 200, a printed wiring board 34, wires 35, and an insulating plate (not shown).

The housing container 31 shown in FIG. 6 is a square-bottomed container having a rectangular bottom surface. The housing container 31 is configured to be capable of housing the protective sheets 33, the battery module 200, the printed wiring board 34, and the wires 35. The lid 32 has a rectangular shape. The lid 32 covers the housing container 31 to house the battery module 200 and such. Although not illustrated, the housing container 31 and the lid 32 are provided with openings, connection terminals, or the like for connection to an external device or the like.

The battery module 200 includes plural single-batteries 100, a positive electrode-side lead 22, a negative electrode-side lead 23, and adhesive tape(s) 24.

At least one of the plural single-batteries 100 is a secondary battery according to the third embodiment. The plural single-batteries 100 are electrically connected in series, as shown in FIG. 7. The plural single-batteries 100 may alternatively be electrically connected in parallel, or connected in a combination of in-series connection and in-parallel connection. If the plural single-batteries 100 are connected in parallel, the battery capacity increases as compared to a case in which they are connected in series.

The adhesive tape(s) 24 fastens the plural single-batteries 100. The plural single-batteries 100 may be fixed using a heat shrinkable tape in place of the adhesive tape(s) 24. In this case, protective sheets 33 are arranged on both side surfaces of the battery module 200, and the heat shrinkable tape is wound around the battery module 200 and protective sheets 33. After that, the heat shrinkable tape is shrunk by heating to bundle the plural single-batteries 100.

One end of the positive electrode-side lead 22 is connected to the battery module 200. The one end of the positive electrode-side lead 22 is electrically connected to the positive electrode(s) of one or more single-battery 100. One end of the negative electrode-side lead 23 is connected to the battery module 200. The one end of the negative electrode-side lead 23 is electrically connected to the negative electrode(s) of one or more single-battery 100.

The printed wiring board 34 is provided along one face in the short side direction among the inner surfaces of the housing container 31. The printed wiring board 34 includes a positive electrode-side connector 342, a negative electrode-side connector 343, a thermistor 345, a protective circuit 346, wirings 342a and 343a, an external power distribution terminal 350, a plus-side (positive-side) wiring 348a, and a minus-side (negative-side) wiring 348b. One principal surface of the printed wiring board 34 faces a surface of the battery module 200. An insulating plate (not shown) is disposed in between the printed wiring board 34 and the battery module 200.

The other end 22a of the positive electrode-side lead 22 is electrically connected to the positive electrode-side connector 342. The other end 23a of the negative electrode-side lead 23 is electrically connected to the negative electrode side connector 343.

The thermistor 345 is fixed to one principal surface of the printed wiring board 34. The thermistor 345 detects the temperature of each single-battery 100 and transmits detection signals to the protective circuit 346.

The external power distribution terminal 350 is fixed to the other principal surface of the printed wiring board 34. The external power distribution terminal 350 is electrically connected to device(s) that exists outside the battery pack 300. The external power distribution terminal 350 includes a positive-side terminal 352 and a negative-side terminal 353.

The protective circuit 346 is fixed to the other principal surface of the printed wiring board 34. The protective circuit 346 is connected to the positive-side terminal 352 via the plus-side wiring 348a. The protective circuit 346 is connected to the negative-side terminal 353 via the minus-side wiring 348b. In addition, the protective circuit 346 is electrically connected to the positive electrode-side connector 342 via the wiring 342a. The protective circuit 346 is electrically connected to the negative electrode-side connector 343 via the wiring 343a. Furthermore, the protective circuit 346 is electrically connected to each of the plural single-batteries 100 via the wires 35.

The protective sheets 33 are arranged on both inner surfaces of the housing container 31 along the long side direction and on the inner surface along the short side direction facing the printed wiring board 34 across the battery module 200. The protective sheets 33 are made of, for example, resin or rubber.

The protective circuit 346 controls charge and discharge of the plural single-batteries 100. The protective circuit 346 is also configured to cut-off electric connection between the protective circuit 346 and the external power distribution terminal 350 (positive-side terminal 352, negative-side terminal 353) to external device(s), based on detection signals transmitted from the thermistor 345 or detection signals transmitted from each single-battery 100 or the battery module 200.

An example of the detection signal transmitted from the thermistor 345 is a signal indicating that the temperature of the single-battery(s) 100 is detected to be a predetermined temperature or more. An example of the detection signal transmitted from each single-battery 100 or the battery module 200 include a signal indicating detection of overcharge, over-discharge, and overcurrent of the single-battery 100. When detecting over charge or the like for each of the single batteries 100, the battery voltage may be detected, or a positive electrode potential or negative electrode potential may be detected. In the latter case, a lithium electrode to be used as a reference electrode may be inserted into each single battery 100.

Note, that as the protective circuit 346, a circuit included in a device (for example, an electronic device or an automobile) that uses the battery pack 300 as a power source may be used.

As described above, the battery pack 300 includes the external power distribution terminal 350. Hence, the battery pack 300 can output current from the battery module 200 to an external device and input current from an external device to the battery module 200 via the external power distribution terminal 350. In other words, when using the battery pack 300 as a power source, the current from the battery module 200 is supplied to an external device via the external power distribution terminal 350. When charging the battery pack 300, a charge current from an external device is supplied to the battery pack 300 via the external power distribution terminal 350. If the battery pack 300 is used as an onboard battery, the regenerative energy of the motive force of a vehicle can be used as the charge current from the external device.

Note that the battery pack 300 may include plural battery modules 200. In this case, the plural battery modules 200 may be connected in series, in parallel, or connected in a combination of in-series connection and in-parallel connection. The printed wiring board 34 and the wires 35 may be omitted. In this case, the positive electrode-side lead 22 and the negative electrode-side lead 23 may respectively be used as the positive-side terminal and negative-side terminal of the external power distribution terminal.

Such a battery pack is used, for example, in applications where excellent cycle performance is demanded when a large current is extracted. More specifically, the battery pack is used as, for example, a power source for electronic devices, a stationary battery, or an onboard battery for various kinds of vehicles including railway cars. An example of the electronic device is a digital camera. The battery pack is particularly favorably used as an onboard battery.

The battery pack according to the fifth embodiment is provided with the active material of the first embodiment, the electrode of the second embodiment, the secondary battery of the third embodiment or the battery module according to the fourth embodiment. Accordingly, the battery pack can exhibit high capacity, excellent large-current performance and long charge-and-discharge cycle life.

Sixth Embodiment

According to a sixth embodiment, a vehicle is provided. The battery pack according to the fifth embodiment is installed on this vehicle.

In the vehicle according to the sixth embodiment, the battery pack is configured, for example, to recover regenerative energy from motive force of the vehicle. The vehicle may include a mechanism (e.g., a regenerator) configured to convert kinetic energy of the vehicle into regenerative energy.

Examples of the vehicle according to the sixth embodiment include two-wheeled to four-wheeled hybrid electric automobiles, two-wheeled to four-wheeled electric automobiles, electrically assisted bicycles, and railway cars.

In the vehicle according to the sixth embodiment, the installing position of the battery pack is not particularly limited. For example, when installing the battery pack on an automobile, the battery pack may be installed in the engine compartment of the automobile, in rear parts of the vehicle body, or under seats.

The vehicle according to the sixth embodiment may have plural battery packs installed. In such a case, batteries included in each of the battery packs may be electrically connected to each other in series, electrically connected in parallel, or electrically connected in a combination of in-series connection and in-parallel connection. For example, in a case where each battery pack includes a battery module, the battery modules may be electrically connected to each other in series, electrically connected in parallel, or electrically connected in a combination of in-series connection and in-parallel connection. Alternatively, in a case where each battery pack includes a single battery, each of the batteries may be electrically connected to each other in series, electrically connected in parallel, or electrically connected in a combination of in-series connection and in-parallel connection.

An example of the vehicle according to the sixth embodiment is explained below, with reference to the drawings.

Figure 8:
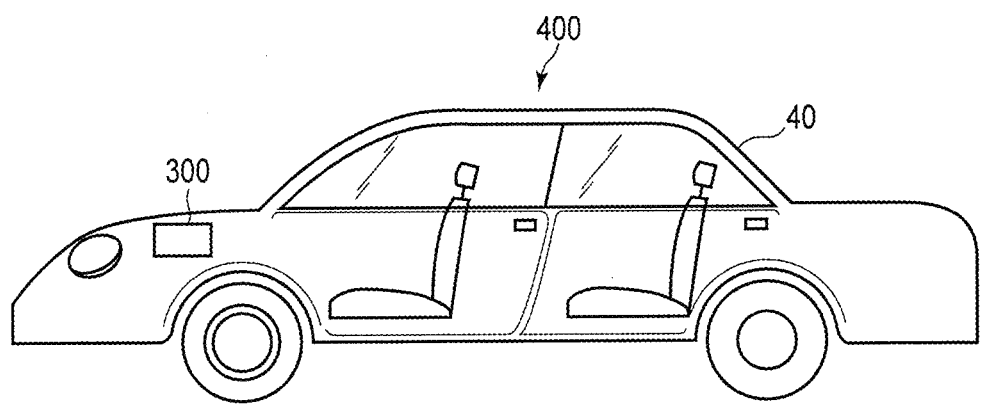
FIG. 8 is a schematic view showing an example of a vehicle in which a secondary battery of an embodiment is installed.

FIG. 8 is a partially see-through diagram schematically showing an example of a vehicle according to the sixth embodiment.

A vehicle 400, shown in FIG. 8 includes a vehicle body 40 and a battery pack 300 according to the fifth embodiment. In the example shown in FIG. 8, the vehicle 400 is a four-wheeled automobile.

This vehicle 400 may have plural battery packs 300 installed. In such a case, the batteries (e.g., single-batteries or battery module) included in the battery packs 300 may be connected in series, connected in parallel, or connected in a combination of in-series connection and in-parallel connection.

In FIG. 8, depicted is an example where the battery pack 300 is installed in an engine compartment located at the front of the vehicle body 40. As mentioned above, for example, the battery pack 300 may be alternatively installed in rear sections of the vehicle body 40, or under a seat. The battery pack 300 may be used as a power source of the vehicle 400. The battery pack 300 can also recover regenerative energy of motive force of the vehicle 400.

Next, with reference to FIG. 9, an aspect of operation of the vehicle according to the sixth embodiment is explained.

FIG. 9 is a diagram schematically showing an example of a control system related to an electric system in the vehicle according to the fourth embodiment. A vehicle 400, shown in FIG. 9, is an electric automobile.

The vehicle 400, shown in FIG. 9, includes a vehicle body 40, a vehicle power source 41, a vehicle ECU (electric control unit) 42, which is a master controller of the vehicle power source 41, an external terminal (an external power connection terminal) 43, an inverter 44, and a drive motor 45.

The vehicle 400 includes the vehicle power source 41, for example, in the engine compartment, in the rear sections of the automobile body, or under a seat. In FIG. 9, the position of the vehicle power source 41 installed in the vehicle 400 is schematically shown.

The vehicle power source 41 includes plural (for example, three) battery packs 300a, 300b and 300c, a battery management unit (BMU) 411, and a communication bus 412.

The battery pack 300a includes a battery module 200a and a battery module monitoring unit 301a (e.g., a VTM: voltage temperature monitoring). The battery pack 300b includes a battery module 200b and a battery module monitoring unit 301b. The battery pack 300c includes a battery module 200c and a battery module monitoring unit 301c. The battery packs 300a to 300c are battery packs similar to the aforementioned battery pack 300, and the battery modules 200a to 200c are battery modules similar to the aforementioned battery module 200. The battery modules 200a to 200c are electrically connected in series. The battery packs 300a, 300b and 300c can each be independently removed, and may be exchanged by a different battery pack 300.

Each of the battery modules 200a to 200c includes plural single-batteries connected in series. At least one of the plural single-batteries is the secondary battery according to the first embodiment. The battery modules 200a to 200c each perform charging and discharging via a positive electrode terminal 413 and a negative electrode terminal 414.

The battery management unit 411 performs communication with the battery module monitoring units 301a to 301c and collects information such as voltages or temperatures for each of the single-batteries 100 included in the battery modules 200a to 200c included in the vehicle power source 41. In this manner, the battery management unit 411 collects information concerning security of the vehicle power source 41.

The battery management unit 411 and the battery module monitoring units 301a to 301c are connected via the communication bus 412. In communication bus 412, a set of communication lines is shared at multiple nodes (i.e., the battery management unit 411 and one or more battery module monitoring units 301a to 301c). The communication bus 412 is, for example, a communication bus configured based on CAN (Control Area Network) standard.

The battery module monitoring units 301a to 301c measure a voltage and a temperature of each single-battery in the battery modules 200a to 200c based on commands from the battery management unit 411. It is possible, however, to measure the temperatures only at several points per battery module, and the temperatures of all of the single-batteries need not be measured.

The vehicle power source 41 may also have an electromagnetic contactor (for example, a switch unit 415 shown in FIG. 9) for switching on and off electrical connection between the positive electrode terminal 413 and the negative electrode terminal 414. The switch unit 415 includes a precharge switch (not shown), which is turned on when the battery modules 200a to 200c are charged, and a main switch (not shown), which is turned on when output from the battery modules 200a to 200c is supplied to a load. The precharge switch and the main switch each include a relay circuit (not shown), which is switched on or off based on a signal provided to a coil disposed near the switch elements. The magnetic contactor such as the switch unit 415 is controlled based on control signals from the battery management unit 411 or the vehicle ECU 42, which controls the operation of the entire vehicle 400.

The inverter 44 converts an inputted direct current voltage to a three-phase alternate current (AC) high voltage for driving a motor. Three-phase output terminal(s) of the inverter 44 is (are) connected to each three-phase input terminal of the drive motor 45. The inverter 44 is controlled based on control signals from the battery management unit 411 or the vehicle ECU 42, which controls the entire operation of the vehicle. Due to the inverter 44 being controlled, output voltage from the inverter 44 is adjusted.

The drive motor 45 is rotated by electric power supplied from the inverter 44. The drive generated by rotation of the motor 45 is transferred to an axle and driving wheels W via a differential gear unit, for example.

The vehicle 400 also includes a regenerative brake mechanism (i.e., a regenerator), though not shown. The regenerative brake mechanism rotates the drive motor 45 when the vehicle 400 is braked, and converts kinetic energy into regenerative energy, as electric energy. The regenerative energy, recovered in the regenerative brake mechanism, is inputted into the inverter 44 and converted to direct current. The converted direct current is inputted into the vehicle power source 41.

One terminal of a connecting line L1 is connected to the negative electrode terminal 414 of the vehicle power source 41. The other terminal of the connecting line L1 is connected to a negative electrode input terminal 417 of the inverter 44. A current detector (current detecting circuit) 416 in the battery management unit 411 is provided on the connecting line Li in between the negative electrode terminal 414 and negative electrode input terminal 417.

One terminal of a connecting line L2 is connected to the positive electrode terminal 413 of the vehicle power source 41. The other terminal of the connecting line L2 is connected to a positive electrode input terminal 418 of the inverter 44. The switch unit 415 is provided on the connecting line L2 in between the positive electrode terminal 413 and the positive electrode input terminal 418.

The external terminal 43 is connected to the battery management unit 411. The external terminal 43 is able to connect, for example, to an external power source.

The vehicle ECU 42 performs cooperative control of the vehicle power source 41, switch unit 415, inverter 44, and the like, together with other management units and control units including the battery management unit 411 in response to inputs operated by a driver or the like. Through the cooperative control by the vehicle ECU 42 and the like, output of electric power from the vehicle power source 41, charging of the vehicle power source 41, and the like are controlled, thereby performing the management of the whole vehicle 400. Data concerning the security of the vehicle power source 41, such as a remaining capacity of the vehicle power source 41, are transferred between the battery management unit 411 and the vehicle ECU 42 via communication lines.

The vehicle according to the sixth embodiment is installed with the battery pack according to the fifth embodiment. Accordingly, a vehicle excellent in traveling performance in a wide temperature range from a low temperature to a high temperature can be achieved.

EXAMPLES

Hereinafter, Examples of embodiments described herein will be described with reference to the drawings in detail, but the embodiments are not intended to be limited to Examples described below.

Example 1

A positive electrode active material here used was lithium nickel cobalt manganese oxide ($LiNi_{0.6}Co_{0.2}Mn_{0.2}O_2$) having an average secondary particle size of 5 μm. Compounded were 5% by weight of acetylene black as a conductive agent and 5% by weight of PVdF as a binder based on 90% by weight of the positive electrode active material. These were dispersed in a n-methyl pyrrolidone (NMP) solvent to prepare a slurry, and thereafter both surfaces of aluminum alloy foil (purity: 99%) having a thickness of 15 μm were coated with the slurry, and the resultant was subjected to drying and pressing, thereby producing a positive electrode having a thickness of a positive electrode material layer (positive electrode active material-containing layer), of 38 μm, and having an electrode density of 2.0 g/cm³.

Next, a titanium oxide powder (anatase-type $TiO_2$) having an average particle size of 0.1 μm and a niobium pentoxide powder ($Nb_2O_5$: purity: 99.9%, containing 0.05% of K and 0.05% of Ta) having an average particle size of 0.1 μm were weighed at a molar ratio of 1:1 and mixed in order to synthesize a negative electrode active material. The powders were subjected to a heat treatment at 1000° C. for 20 hours. A sample obtained was subjected to powder X-ray diffraction measurement to provide a diffraction diagram, and such a sample synthesized was confirmed to have an objective monoclinic crystal, based on the results of analysis of a crystal structure according to the Rietveld method. The average primary particle size was 1 μm.

The molar ratio of Ti and Nb elements was obtained by performing ICP analysis. The ICP analysis was made by, specifically, once metering the active material serving as a sample, in a Pt crucible, decomposing it by alkaline fusion, to produce a measurement solution, and then quantitatively measuring the amounts of Nb and Ti by ICP emission spectrometry using an internal standard method, for example, ICP emission spectrometry using SPS-4000 (manufactured by Hitachi High-Tech Science Corporation). As a result, the composition of the sample was $TiK_{0.002}Ta_{0.001}Nb_{1.99}O_7$. The ratio ($\alpha/\beta$) of the number of mole of Nb to the number of mole of Ti was 1.99.

The resulting $TiK_{0.002}Ta_{0.001}Nb_{1.99}O_7$ powder was added to an aqueous solution where 5% by weight of a powder of a multi-layer carbon nanotube (MCNT) having an average fiber diameter of 20 nm and containing a metal element including Co, Ni and Fe is dispersed, and the resultant was stirred and mixed for uniform dispersion. Herein, the ratio ($\gamma/\sigma$) of the weight of the metal element to the weight of carbon in the carbon fibers was measured by the above method, and was 0.001. The ratio of the fiber length to the fiber diameter (fiber length/fiber diameter) of the carbon fibers was 200. Thereafter, a cellulose nanofiber (CeNF), carboxymethyl cellulose (CMC) and styrene-butadiene rubber (SBR) each serving as a binder, and graphite and acetylene black (AB) each serving as a conductive agent were added to the dispersion liquid, and the resultant was stirred using a ball mill in conditions of a rotation speed of 1000 rpm and a stirring time of 2 hours, thereby producing a negative electrode slurry. The weight ratio of $TiK_{0.002}Ta_{0.001}Nb_{1.99}O_7$, MCNT, graphite, AB, CeNF, CMC and SBR compounded was adjusted to 90:2:3:1:1:1:2. The ratio of the carbon fibers to be added, which is the ratio of the weight of the carbon fibers to the weight of niobium titanium composite oxide particles, is shown in the following Table 1.

Aluminum foil (purity: 99.3%) having a thickness of 15 μm was coated with the resulting slurry, and subjected to drying and heat-pressing, thereby producing a negative electrode having a thickness of a negative electrode material layer (negative electrode active material-containing layer), of 30 μm, and having an electrode density of 2.7 g/cm³. The negative electrode material layer had a BET specific surface area (surface area per gram of the negative electrode material layer) of 5 m²/g.

On the other hand, a regenerated cellulose fiber separator with pulp as a raw material, having a thickness of 12 μm, a porosity of 65% and an average fiber diameter of 1 μm, was brought into contact with a positive electrode and the positive electrode was covered with the separator. The negative electrode was stacked so as to be opposite to the positive electrode with the separator interposed, the positive electrode active material-containing layer was covered with the negative electrode active material-containing layer with the separator interposed, and the resultant was wound in a spiral manner to thereby produce an electrode group.

The electrode group was further pressed to thereby provide a flat form. The electrode group was accommodated in a thin metal can including an aluminum alloy (Al purity: 99%), having a thickness of 0.3 mm.

On the other hand, a liquid organic electrolyte (nonaqueous electrolytic solution) was prepared by dissolving 1.2 mol/L of lithium hexafluorophosphate ($LiPF_6$) as a lithium salt, in a mixed solvent (volume ratio 25:25:50) of propylene carbonate (PC), ethylene carbonate (EC) and diethyl carbonate (DEC), as an organic solvent. The nonaqueous electrolyte was injected to the electrode group in the container, thereby producing a thin nonaqueous electrolyte secondary battery having the structure described above and shown in FIG. 1 and having a thickness of 14 mm, a width of 62 mm and a height of 94 mm. The battery had a discharge capacity of 10 Ah and an intermediate voltage (voltage in 50% discharge) of 2.25 V.

Examples 2 to 18 and Comparative Examples 1 to 6

Each thin nonaqueous electrolyte secondary battery was produced in a similar manner as described in Example 1 except that the molar ratio ($\alpha/\beta$), the type of the metal element in the carbon fibers, the weight ratio ($\gamma/\sigma$), the average fiber diameter of the carbon fibers, the type and w of the M element, the average primary particle size of the niobium titanium composite oxide particles, and the ratio of the carbon fibers to be added (carbon fibers/niobium titanium composite oxide particles) were as shown in the following Tables 1 and 2.

Comparative Example 7

A niobium titanium composite oxide particles where the molar ratio ($\alpha/\beta$), the type and w of the M element, and the average primary particle size were as shown in Table 2 was added to an aqueous 5% by weight sucrose solution, and the resultant was stirred and then dried at 80° C. The resulting precursor was subjected to a heat treatment in an argon atmosphere at 550° C. for 6 hours, thereby covering a surface of the niobium titanium composite oxide particles with a carbon layer. The carbon layer included a carbon fibers containing Si, Na and K in amounts such that ($\gamma/\sigma$) was as described in Table 2. The average fiber diameter of the carbon fibers and the ratio of the carbon fibers to be added (carbon fibers/niobium titanium composite oxide particles) are shown in Table 2. A negative electrode was produced in a similar manner as in Example 1 except that the resulting active material was used instead of the mixture of $TiK_{0.002}Ta_{0.001}Nb_{1.99}O_7$ and MCNT.

The metal element in the carbon fibers was derived from impurities contained in the aqueous sucrose solution, and it was thus presumed that a value of ($\gamma/\sigma$) of 0.2 was based on no volatilization of impurities as a result of a heat treatment with a raw material that includes an aqueous sucrose solution including many impurities at a low temperature of 550° C.

A thin nonaqueous electrolyte secondary battery was produced in a similar manner as described in Example 1 except that the resulting negative electrode was used.

The resulting secondary battery was charged to 3.0 V at 25° C. and a constant current of 1 C rate for 1.5 hours and then discharged to 1.5 V at 1 C rate, and the discharge capacity was here measured. A cycle test was made by repeating a charge-and-discharge cycle of charge to 3.0 V at 25° C. and a constant current of 1 C rate for 1.5 hours and thereafter discharge to 1.5 V at 1 C rate, and determining a number of cycles, where the width of a decrease in capacity reached 20%, as the number of cycle-life. The capacity retention ratio of the discharge capacity at 10 C to the discharge capacity at 1 C was determined as large current discharge performance. Such measurement results are shown in the following Tables 3 and 4.

TABLE 1

|  | $\alpha/\beta$ | M | w | Metal element in carbon fibers | $\gamma/\sigma$ | Average fiber diameter of carbon σ fibers (nm) | Ratio of addition (% by weight) | Average primary particle size (μm) |
|---|---|---|---|---|---|---|---|---|
| Example 1 | 1.99 | K, Ta | 0.003 | Co, Ni, Fe | 0.001 | 20 | 2.22 | 1.0 |
| Example 2 | 2.0 | — | 0 | Fe | 0.0005 | 25 | 2.22 | 0.5 |
| Example 3 | 2.05 | K | 0.004 | Co | 0.0002 | 10 | 2.22 | 1.2 |
| Example 4 | 1.98 | K, Ta | 0.01 | Co, Fe | 0.01 | 80 | 2.22 | 0.5 |
| Example 5 | 1.5 | — | 0 | Ni, Fe | 0.001 | 15 | 2.22 | 0.3 |
| Example 6 | 2.5 | K, Ta | 0.01 | Co, Ni, Fe | 0.002 | 25 | 2.22 | 2.0 |
| Example 7 | 2.0 | K | 0.01 | Co, Ni, Fe | 0.001 | 10 | 2.22 | 1.5 |
| Example 8 | 1.99 | K, Ta | 0.01 | Co | 0.0001 | 50 | 2.22 | 1.8 |
| Example 9 | 2.0 | K | 0.001 | Co, Ni, Fe | 0.001 | 10 | 2.22 | 0.5 |
| Example 10 | 2.05 | K, Ta | 0.002 | Co, Fe | 0.00015 | 10 | 2.22 | 0.5 |

TABLE 1-continued

|  | α/β | M | w | Metal element in carbon fibers | γ/σ | Average fiber diameter of carbon fibers (nm) | Ratio of addition (% by weight) | Average primary particle size (μm) |
|---|---|---|---|---|---|---|---|---|
| Example 11 | 1.99 | K, Ta | 0.003 | Co, Ni, Fe | 0.002 | 5 | 2.22 | 1.0 |
| Example 12 | 1.99 | K, Ta | 0.003 | Co, Ni, Fe | 0.01 | 100 | 2.22 | 1.0 |
| Example 13 | 2.05 | K | 0.004 | Co | 0.0002 | 10 | 0.1 | 1.2 |
| Example 14 | 2.05 | K | 0.004 | Co | 0.0002 | 10 | 0.3 | 1.2 |
| Example 15 | 2.05 | K | 0.004 | Co | 0.0002 | 10 | 1.0 | 1.2 |
| Example 16 | 2.05 | K | 0.004 | Co | 0.0002 | 10 | 3.0 | 1.2 |
| Example 17 | 2.05 | K | 0.004 | Co | 0.0002 | 10 | 5.0 | 1.2 |
| Example 18 | 1.99 | K,Ta | 0.003 | Co, Ni, Fe | 0.0002 | 10 | 3.0 | 0.1 |

TABLE 2

|  | α/β | M | w | Metal element in carbon fibers | γ/σ | Average fiber diameter of carbon fibers (nm) | Ratio of addition (% by weight) | Average primary particle size (μm) |
|---|---|---|---|---|---|---|---|---|
| Comparative Example 1 | 2.05 | K | 0.004 | — | — | — | 0 | 1.2 |
| Comparative Example 2 | 1.3 | — | 0 | — | — | — | 0 | 0.8 |
| Comparative Example 3 | 2.05 | K | 0.015 | Co | 0.00005 | 10 | 0.05 | 2.5 |
| Comparative Example 4 | 2.05 | K, Ta | 0.02 | Fe | 0.02 | 150 | 0.01 | 3 |
| Comparative Example 5 | 2.05 | K, Ta | 0.02 | Fe | 0.02 | 200 | 0.01 | 3 |
| Comparative Example 6 | 2.6 | K, Ta | 0.02 | Co | 0.02 | 200 | 7 | 3 |
| Comparative Example 7 | 2.02 | K, Ta | 0.003 | Si, Na, K | 0.2 | 1200 | 1 | 1.0 |

TABLE 3

|  | Capacity (Ah) | Cycle life (times) | Capacity retention ratio in discharge at 10 C (%) |
|---|---|---|---|
| Example 1 | 10 | 12000 | 80 |
| Example 2 | 10.1 | 10000 | 82 |
| Example 3 | 10.3 | 13000 | 88 |
| Example 4 | 9.8 | 8000 | 75 |
| Example 5 | 8.0 | 12000 | 80 |
| Example 6 | 10.5 | 8000 | 75 |
| Example 7 | 10 | 12000 | 75 |
| Example 8 | 10 | 9000 | 75 |
| Example 9 | 10 | 12000 | 88 |
| Example 10 | 10.2 | 11000 | 82 |
| Example 11 | 10 | 13000 | 78 |
| Example 12 | 10 | 7000 | 70 |
| Example 13 | 9.0 | 3000 | 60 |
| Example 14 | 9.2 | 4000 | 65 |
| Example 15 | 9.7 | 8000 | 70 |
| Example 16 | 10.1 | 14000 | 88 |
| Example 17 | 9.9 | 13000 | 82 |
| Example 18 | 10.5 | 6000 | 90 |

TABLE 4

|  | Capacity (Ah) | Cycle life (times) | Capacity retention ratio in discharge at 10 C (%) |
|---|---|---|---|
| Comparative Example 1 | 8.0 | 1000 | 50 |
| Comparative Example 2 | 6.0 | 1500 | 55 |
| Comparative Example 3 | 8.5 | 2000 | 56 |
| Comparative Example 4 | 8.2 | 1600 | 50 |
| Comparative Example 5 | 8.2 | 1400 | 45 |
| Comparative Example 6 | 8.0 | 1000 | 55 |
| Comparative Example 7 | 7.2 | 800 | 40 |

As clear from Tables 1 to 4, the battery of each of Examples 1 to 18 not only realized a battery capacity comparable to or more than that of each of Comparative Examples 1 to 7, but also was more excellent in cycle life and large current discharge performance (capacity retention ratio in discharge at 10 C) than those of each of Comparative Examples 1 to 7. In particular, the battery capacity was excellent with respect to Examples 2, 3, 6, 10 and 16. The large current discharge performance was excellent with respect to Examples 3, 9 and 16. The cycle life performance was excellent with respect to Examples 1, 3, 5, 7, 9, 11, 16 and 17.

It was found from comparison of Examples 3 and 13 to that the discharge capacity, the cycle life and the large current discharge performance were more excellent at a higher ratio of addition in a ratio range of addition of 0.1% by weight or more and 5% by weight or less.

In comparison of Examples 11 and 12 with other Examples where the average fiber diameter of the carbon fibers was in the range of 10 nm or more and 90 nm or less, Examples 11 and 12 exhibited excellent cycle life performance at a high level, but exhibited the large current discharge performance only at the 70% level. It could be said from the results of Examples 6, 7, 8 and 18 that more excellent large current discharge performance was easily obtained at a smaller average primary particle size and more excellent cycle life performance was easily obtained at a larger average primary particle size.

Comparative Example 1 was inferior in capacity, cycle life and large current discharge performance as compared with Examples because no carbon fibers was used although monoclinic niobium titanium composite oxide particles satisfying the expression (1) and having an average primary particle size of 0.05 μm or more and 2 μm or less was included. Comparative Example 2 was low in capacity as compared with Comparative Example 1 because not only no carbon fibers were included, but also niobium titanium composite oxide particles whose composition was out of the expression (1) was included. Comparative Examples 3 to 5 were inferior in capacity, cycle life and large current discharge performance as compared with Examples because the expression (2) was not satisfied and w and the average primary particle size were out of proper ranges although the expression (1) was satisfied. On the other hand, Comparative Example 6 was inferior in capacity, cycle life and large current discharge performance as compared with Examples because the expression (1) and the expression (2) were not satisfied and w and the average primary particle size were out of proper ranges. Comparative Example 7 where a surface of the niobium titanium composite oxide particles was coated with the carbon fibers by a pyrolysis reaction was inferior in capacity, cycle life and large current discharge performance as compared with Examples.

FIG. 10 and FIG. 11 each show a SEM photograph of the negative electrode active material in Example 1. As shown in FIG. 10, niobium titanium composite oxide particles 500 in the field of view is less aggregated and highly includes an independent primary particle. FIG. 11 shows a SEM photograph of the enlarged niobium titanium composite oxide particles 500. As shown in FIG. 11, carbon nanotubes 501 have adhesion to at least a part of surfaces of the niobium titanium composite oxide particles 500. It was also confirmed by SEM observation with respect to the negative electrode active material of each of Examples 2 to 18 that the carbon nanotubes had adhesion to at least a part of surfaces of the niobium titanium composite oxide particles.

According to an active material of at least one embodiment or Example described above, the active material includes monoclinic niobium titanium composite oxide particles satisfying the expression (1) and having an average primary particle size of 0.05 μm or more and 2 μm or less, and carbon fibers containing one or more metal elements selected from the group consisting of Fe, Co and Ni, satisfying the expression (2), and having an average fiber diameter in the range of 5 nm or more and 100 nm or less, and thus an electrode active material can be provided which is excellent in large-current performance and cycle life performance.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An electrode comprising an active material-containing layer comprising an active material, a binder, and a conductive agent, the active material comprising:
   monoclinic niobium titanium composite oxide particles which satisfy the following expression (1) and which are able to allow Li ions to be inserted and to be extracted; and
   carbon fibers, which comprise one or more metal elements selected from the group consisting of Fe, Co and Ni, which satisfy the following expression (2) and which have an average fiber diameter in a range of 5 μm to 100 μm; wherein
   the niobium titanium composite oxide particles have an average primary particle size in a range of 0.05 μm to 2 μm, $$1.5 \leq (\alpha/\beta) \leq 2.5 \tag{1}$$

$$1/10000 \leq (\gamma/\sigma) \leq 1/100 \tag{2}$$

wherein α represents a number of mole of Nb in the niobium titanium composite oxide particles, β represents a number of mole of Ti in the niobium titanium composite oxide particles, γ represents a weight of all the metal elements in the carbon fibers, and σ represents a weight of carbon in the carbon fibers, and
wherein the carbon fibers are integrated to at least a part of surfaces of the niobium titanium composite oxide particles by the binder or the metal elements, and
the conductive agent is at least one selected from the group consisting of acetylene black, carbon black, coke, carbon nanotube, graphite, metal compound powder, and metal powder, and
wherein the niobium titanium composite oxide particles comprise a monoclinic niobium titanium composite oxide represented by $Li_xTiM_wNb_{2\pm y}O_{7\pm z}$, where $0 \leq x \leq 5$, $0 \leq y \leq 0.5$, $-0.3 \leq z \leq 0.3$ and $0 < w \leq 0.01$ are satisfied, and M comprises K and Ta.

2. The electrode according, to claim 1, wherein the w satisfies the following expression (3)

$$0.001 \leq w \leq 0.005 \tag{3}.$$

3. The electrode according to claim 1, wherein a value of the (γ/σ) satisfies the following expression (4)

$$1.5/10000 \leq (\gamma/\sigma) \leq 1/1000 \tag{4}.$$

4. The electrode according to claim 1, wherein the niobium titanium composite oxide particles comprise at least one selected from the group consisting of Mg, Al, V, Fe, Mo, Sn and W.

5. The electrode according to claim 1, wherein the carbon fibers comprising one or more metal elements is a vapor-grown carbon fibers comprising one or more metal elements.

6. A secondary battery comprising a positive electrode, the active material according claim 1 as a negative electrode, and a nonaqueous electrolyte.

7. A battery pack comprising the secondary battery according to claim 6.

8. The battery pack according to claim 7, further comprising:
   an external power distribution terminal; and
   a protective circuit.

9. The battery pack according to claim 7, comprising plural of the secondary battery,
wherein the secondary batteries are electrically connected in series, in parallel, or in a combination of in-series and in-parallel.

10. A vehicle comprising the battery pack according to claim 7.

11. The vehicle according to claim 10, comprising a mechanism configured to convert kinetic energy of the vehicle into regenerative energy.

12. The electrode according to claim 1, wherein a content of the active material in the active material-containing layer is from 90 to 99% by weight, and a content of the binder in the active material-containing layer is from 2 to 7% by weight.

13. The electrode according to claim 1, wherein the M in the $Li_xTiM_wNb_{2\pm y}O_{7\pm z}$ is K and Ta.

* * * * *